US010606414B2

(12) United States Patent
    Christiansson et al.

(10) Patent No.: US 10,606,414 B2
(45) Date of Patent: Mar. 31, 2020

(54) ERASER FOR TOUCH DISPLAYS

(71) Applicant: FlatFrog Laboratories AB, Lund (SE)

(72) Inventors: Tomas Christiansson, Torna-Hällestad (SE); Kristofer Jakobson, Malmö (SE); Nicklas Ohlsson, Bunkeflostrand (SE)

(73) Assignee: FlatFrog Laboratories AB, Lund (SE)

( * ) Notice: Subject to any disclaimer, the term of this patent is extended or adjusted under 35 U.S.C. 154(b) by 47 days.

(21) Appl. No.: 15/925,230

(22) Filed: Mar. 19, 2018

(65) Prior Publication Data
    US 2018/0275788 A1   Sep. 27, 2018

(30) Foreign Application Priority Data

Mar. 22, 2017  (SE) .................................. 1730073
Apr. 28, 2017  (SE) .................................. 1730120
May 24, 2017  (EP) .................................. 17172910
Oct. 5, 2017   (SE) .................................. 1730276

(51) Int. Cl.
    *G06F 3/042*   (2006.01)
(52) U.S. Cl.
    CPC ............ *G06F 3/0421* (2013.01); *G06F 3/042* (2013.01); *G06F 2203/04106* (2013.01); *G06F 2203/04109* (2013.01)
(58) Field of Classification Search
    None
    See application file for complete search history.

(56) References Cited

U.S. PATENT DOCUMENTS

| 3,440,426 | A | 4/1969  | Bush          |
|-----------|---|---------|---------------|
| 3,553,680 | A | 1/1971  | Cooreman      |
| 3,673,327 | A | 6/1972  | Johnson et al.|
| 4,129,384 | A | 12/1978 | Walker et al. |
| 4,180,702 | A | 12/1979 | Sick et al.   |

(Continued)

FOREIGN PATENT DOCUMENTS

| AU | 2008 280 952 A1 | 3/2009 |
| CN |    201233592 Y  | 5/2009 |

(Continued)

OTHER PUBLICATIONS

Ahn, Y., et al., "A slim and wide multi-touch tabletop interface and its applications," BigComp2014, IEEE, 2014, in 6 pages.

(Continued)

*Primary Examiner* — Nicholas J Lee
(74) *Attorney, Agent, or Firm* — Knobbe, Martens Olson & Bear, LLP

(57) ABSTRACT

An optical IR touch sensing apparatus configured to determine, based on output signals of light detectors, a light energy value for each light path across a touch surface, and generate a transmission value for each light path based on the light energy value. A processor is then configured to process the transmission values to determine an object reference point on the touch surface where the light is attenuated or occluded by an object and determine, from a set of light paths unaffected by an object, a set of object boundary light paths comprising one or more light paths passing closest to the object reference point. The characteristics of the object may then be determined in dependence on the set of object boundary light paths.

13 Claims, 10 Drawing Sheets

(56) References Cited

U.S. PATENT DOCUMENTS

| | | |
|---|---|---|
| 4,209,255 A | 6/1980 | Heynau et al. |
| 4,213,707 A | 7/1980 | Evans, Jr. |
| 4,254,333 A | 3/1981 | Bergström |
| 4,254,407 A | 3/1981 | Tipon |
| 4,294,543 A | 10/1981 | Apple et al. |
| 4,346,376 A | 8/1982 | Mallos |
| 4,420,261 A | 12/1983 | Barlow et al. |
| 4,484,179 A | 11/1984 | Kasday |
| 4,507,557 A | 3/1985 | Tsikos |
| 4,521,112 A | 6/1985 | Kuwabara et al. |
| 4,542,375 A | 9/1985 | Alles et al. |
| 4,550,250 A | 10/1985 | Mueller et al. |
| 4,593,191 A | 6/1986 | Alles |
| 4,673,918 A | 6/1987 | Adler et al. |
| 4,688,933 A | 8/1987 | Lapeyre |
| 4,688,993 A | 8/1987 | Ferris et al. |
| 4,692,809 A | 9/1987 | Beining et al. |
| 4,710,760 A | 12/1987 | Kasday |
| 4,736,191 A | 4/1988 | Matzke et al. |
| 4,737,626 A | 4/1988 | Hasegawa |
| 4,746,770 A | 5/1988 | McAvinney |
| 4,752,655 A | 6/1988 | Tajiri et al. |
| 4,772,763 A | 9/1988 | Garwin et al. |
| 4,782,328 A | 11/1988 | Denlinger |
| 4,812,833 A | 3/1989 | Shimauchi |
| 4,837,430 A | 6/1989 | Hasegawa |
| 4,868,912 A | 9/1989 | Doering |
| 4,891,829 A | 1/1990 | Deckman et al. |
| 4,916,712 A | 4/1990 | Bender |
| 4,933,544 A | 6/1990 | Tamaru |
| 4,949,079 A | 8/1990 | Loebner |
| 4,986,662 A | 1/1991 | Bures |
| 4,988,983 A | 1/1991 | Wehrer |
| 5,065,185 A | 11/1991 | Powers et al. |
| 5,073,770 A | 12/1991 | Lowbner |
| 5,105,186 A | 4/1992 | May |
| 5,159,322 A | 10/1992 | Loebner |
| 5,166,668 A | 11/1992 | Aoyagi |
| 5,227,622 A | 7/1993 | Suzuki |
| 5,248,856 A | 9/1993 | Mallicoat |
| 5,254,407 A | 10/1993 | Sergerie et al. |
| 5,345,490 A | 9/1994 | Finnigan et al. |
| 5,383,022 A | 1/1995 | Kaser |
| 5,483,261 A | 1/1996 | Yasutake |
| 5,484,966 A | 1/1996 | Segen |
| 5,499,098 A | 3/1996 | Ogawa |
| 5,502,568 A | 3/1996 | Ogawa et al. |
| 5,525,764 A | 6/1996 | Junkins et al. |
| 5,526,422 A | 6/1996 | Keen |
| 5,570,181 A | 10/1996 | Yasuo et al. |
| 5,572,251 A | 11/1996 | Ogawa |
| 5,577,501 A | 11/1996 | Flohr et al. |
| 5,600,105 A | 2/1997 | Fukuzaki et al. |
| 5,608,550 A | 3/1997 | Epstein et al. |
| 5,672,852 A | 9/1997 | Fukuzaki et al. |
| 5,679,930 A | 10/1997 | Katsurahira |
| 5,686,942 A | 11/1997 | Ball |
| 5,688,933 A | 11/1997 | Evans et al. |
| 5,729,249 A | 3/1998 | Yasutake |
| 5,736,686 A | 4/1998 | Perret, Jr. et al. |
| 5,740,224 A | 4/1998 | Müller et al. |
| 5,764,223 A | 6/1998 | Chang et al. |
| 5,767,517 A | 6/1998 | Hawkins |
| 5,775,792 A | 7/1998 | Wiese |
| 5,945,980 A | 8/1999 | Moissev et al. |
| 5,945,981 A | 8/1999 | Paull et al. |
| 5,959,617 A | 9/1999 | Bird et al. |
| 6,061,177 A | 5/2000 | Fujimoto |
| 6,067,079 A | 5/2000 | Shieh |
| 6,122,394 A | 9/2000 | Neukermans et al. |
| 6,141,104 A | 10/2000 | Schulz et al. |
| 6,172,667 B1 | 1/2001 | Sayag |
| 6,175,999 B1 | 1/2001 | Sloan et al. |
| 6,227,667 B1 | 5/2001 | Halldorsson et al. |
| 6,229,529 B1 | 5/2001 | Yano et al. |
| 6,333,735 B1 | 12/2001 | Anvekar |
| 6,366,276 B1 | 4/2002 | Kunimatsu et al. |
| 6,380,732 B1 | 4/2002 | Gilboa |
| 6,380,740 B1 | 4/2002 | Laub |
| 6,390,370 B1 | 5/2002 | Plesko |
| 6,429,857 B1 | 8/2002 | Masters et al. |
| 6,452,996 B1 | 9/2002 | Hsieh |
| 6,476,797 B1 | 11/2002 | Kurihara et al. |
| 6,492,633 B2 | 12/2002 | Nakazawa et al. |
| 6,495,832 B1 | 12/2002 | Kirby |
| 6,504,143 B2 | 1/2003 | Koops et al. |
| 6,529,327 B1 | 3/2003 | Graindorge |
| 6,538,644 B1 | 3/2003 | Muraoka |
| 6,587,099 B2 | 7/2003 | Takekawa |
| 6,648,485 B1 | 11/2003 | Colgan et al. |
| 6,660,964 B1 | 12/2003 | Benderly |
| 6,664,498 B2 | 12/2003 | Forsman et al. |
| 6,664,952 B2 | 12/2003 | Iwamoto et al. |
| 6,690,363 B2 | 2/2004 | Newton |
| 6,707,027 B2 | 3/2004 | Liess et al. |
| 6,738,051 B2 | 5/2004 | Boyd et al. |
| 6,748,098 B1 | 6/2004 | Rosenfeld |
| 6,784,948 B2 | 8/2004 | Kawashima et al. |
| 6,799,141 B1 | 9/2004 | Stoustrup et al. |
| 6,806,871 B1 | 10/2004 | Yasue |
| 6,927,384 B2 | 8/2005 | Reime et al. |
| 6,940,286 B2 | 9/2005 | Wang et al. |
| 6,965,836 B2 | 11/2005 | Richardson |
| 6,972,753 B1 | 12/2005 | Kimura et al. |
| 6,985,137 B2 | 1/2006 | Kaikuranta |
| 7,042,444 B2 | 5/2006 | Cok |
| 7,084,859 B1 | 8/2006 | Pryor |
| 7,133,031 B2 | 11/2006 | Wang et al. |
| 7,176,904 B2 | 2/2007 | Satoh |
| 7,199,932 B2 | 4/2007 | Sugiura |
| 7,359,041 B2 | 4/2008 | Xie et al. |
| 7,397,418 B1 | 7/2008 | Doerry et al. |
| 7,432,893 B2 | 10/2008 | Ma et al. |
| 7,435,940 B2 | 10/2008 | Eliasson et al. |
| 7,436,443 B2 | 10/2008 | Hirunuma et al. |
| 7,442,914 B2 | 10/2008 | Eliasson et al. |
| 7,465,914 B2 | 12/2008 | Eliasson et al. |
| 7,613,375 B2 | 11/2009 | Shimizu |
| 7,629,968 B2 | 12/2009 | Miller et al. |
| 7,646,833 B1 | 1/2010 | He et al. |
| 7,653,883 B2 | 1/2010 | Hotelling et al. |
| 7,655,901 B2 | 2/2010 | Idzik et al. |
| 7,705,835 B2 | 4/2010 | Eikman |
| 7,729,056 B2 | 6/2010 | Hwang et al. |
| 7,847,789 B2 | 12/2010 | Kolmykov-Zotov et al. |
| 7,855,716 B2 | 12/2010 | McCreary et al. |
| 7,859,519 B2 | 12/2010 | Tulbert |
| 7,924,272 B2 | 4/2011 | Boer et al. |
| 7,932,899 B2 | 4/2011 | Newton et al. |
| 7,969,410 B2 | 6/2011 | Kakarala |
| 7,995,039 B2 | 8/2011 | Eliasson et al. |
| 8,013,845 B2 | 9/2011 | Ostergaard et al. |
| 8,031,186 B2 | 10/2011 | Ostergaard |
| 8,077,147 B2 | 12/2011 | Krah et al. |
| 8,093,545 B2 | 1/2012 | Leong et al. |
| 8,094,136 B2 | 1/2012 | Eliasson et al. |
| 8,094,910 B2 | 1/2012 | Xu |
| 8,149,211 B2 | 4/2012 | Hayakawa et al. |
| 8,218,154 B2 | 7/2012 | Østergaard et al. |
| 8,274,495 B2 | 9/2012 | Lee |
| 8,325,158 B2 | 12/2012 | Yatsuda et al. |
| 8,339,379 B2 | 12/2012 | Goertz et al. |
| 8,350,827 B2 | 1/2013 | Chung et al. |
| 8,384,010 B2 | 2/2013 | Hong et al. |
| 8,407,606 B1 | 3/2013 | Davidson et al. |
| 8,441,467 B2 | 5/2013 | Han |
| 8,445,834 B2 | 5/2013 | Hong et al. |
| 8,466,901 B2 | 6/2013 | Yen et al. |
| 8,482,547 B2 | 7/2013 | Cobon et al. |
| 8,542,217 B2 | 9/2013 | Wassvik et al. |
| 8,567,257 B2 | 10/2013 | Van Steenberge et al. |
| 8,581,884 B2 | 11/2013 | Fåhraeus et al. |
| 8,624,858 B2 | 1/2014 | Fyke et al. |
| 8,686,974 B2 | 4/2014 | Christiansson et al. |

(56) References Cited

U.S. PATENT DOCUMENTS

| | | |
|---|---|---|
| 8,692,807 B2 | 4/2014 | Føhraeus et al. |
| 8,716,614 B2 | 5/2014 | Wassvik |
| 8,727,581 B2 | 5/2014 | Saccomanno |
| 8,745,514 B1 | 6/2014 | Davidson |
| 8,780,066 B2 | 7/2014 | Christiansson et al. |
| 8,830,181 B1 | 9/2014 | Clark et al. |
| 8,860,696 B2 | 10/2014 | Wassvik et al. |
| 8,872,098 B2 | 10/2014 | Bergström et al. |
| 8,872,801 B2 | 10/2014 | Bergström et al. |
| 8,884,900 B2 | 11/2014 | Wassvik |
| 8,890,843 B2 | 11/2014 | Wassvik et al. |
| 8,890,849 B2 | 11/2014 | Christiansson et al. |
| 8,928,590 B1 | 1/2015 | El Dokor |
| 8,963,886 B2 | 2/2015 | Wassvik |
| 8,982,084 B2 | 3/2015 | Christiansson et al. |
| 9,024,916 B2 | 5/2015 | Christiansson |
| 9,035,909 B2 | 5/2015 | Christiansson |
| 9,063,614 B2 | 6/2015 | Petterson et al. |
| 9,063,617 B2 | 6/2015 | Eliasson et al. |
| 9,086,763 B2 | 7/2015 | Johansson et al. |
| 9,134,854 B2 | 9/2015 | Wassvik et al. |
| 9,158,401 B2 | 10/2015 | Christiansson |
| 9,158,415 B2 | 10/2015 | Song et al. |
| 9,201,520 B2 | 12/2015 | Benko et al. |
| 9,213,445 B2 | 12/2015 | King et al. |
| 9,274,645 B2 | 3/2016 | Christiansson et al. |
| 9,280,237 B2 | 3/2016 | Kukulj |
| 9,317,168 B2 | 4/2016 | Christiansson et al. |
| 9,323,396 B2 | 4/2016 | Han et al. |
| 9,366,565 B2 | 6/2016 | Uvnäs |
| 9,377,884 B2 | 6/2016 | Christiansson et al. |
| 9,389,732 B2 | 7/2016 | Craven-Bartle |
| 9,411,444 B2 | 8/2016 | Christiansson et al. |
| 9,411,464 B2 | 8/2016 | Wallander et al. |
| 9,430,079 B2 | 8/2016 | Christiansson et al. |
| 9,442,574 B2 | 9/2016 | Fåhraeus et al. |
| 9,547,393 B2 | 1/2017 | Christiansson et al. |
| 9,552,103 B2 | 1/2017 | Craven-Bartle et al. |
| 9,557,846 B2 | 1/2017 | Baharav et al. |
| 9,588,619 B2 | 3/2017 | Christiansson et al. |
| 9,594,467 B2 | 3/2017 | Christiansson et al. |
| 9,618,682 B2 | 4/2017 | Yoon et al. |
| 9,626,018 B2 | 4/2017 | Christiansson et al. |
| 9,626,040 B2 | 4/2017 | Wallander et al. |
| 9,639,210 B2 | 5/2017 | Wallander et al. |
| 9,678,602 B2 | 6/2017 | Wallander |
| 9,684,414 B2 | 6/2017 | Christiansson et al. |
| 9,710,101 B2 | 7/2017 | Christiansson et al. |
| 9,874,978 B2 | 1/2018 | Wall |
| 10,013,107 B2 | 7/2018 | Christiansson et al. |
| 10,019,113 B2 | 7/2018 | Christiansson et al. |
| 2001/0002694 A1 | 6/2001 | Nakazawa et al. |
| 2001/0005004 A1 | 6/2001 | Shiratsuki et al. |
| 2001/0005308 A1 | 6/2001 | Oishi et al. |
| 2001/0030642 A1 | 10/2001 | Sullivan et al. |
| 2002/0067348 A1 | 6/2002 | Masters et al. |
| 2002/0075243 A1 | 6/2002 | Newton |
| 2002/0118177 A1 | 8/2002 | Newton |
| 2002/0158823 A1 | 10/2002 | Zavracky et al. |
| 2002/0158853 A1 | 10/2002 | Sugawara et al. |
| 2002/0163505 A1 | 11/2002 | Takekawa |
| 2003/0016450 A1 | 1/2003 | Bluemel et al. |
| 2003/0034439 A1 | 2/2003 | Reime et al. |
| 2003/0034935 A1 | 2/2003 | Amanai et al. |
| 2003/0048257 A1 | 3/2003 | Mattila |
| 2003/0052257 A1 | 3/2003 | Sumriddetchkajorn |
| 2003/0095399 A1 | 5/2003 | Grenda et al. |
| 2003/0107748 A1 | 6/2003 | Lee |
| 2003/0137494 A1 | 7/2003 | Tulbert |
| 2003/0156100 A1 | 8/2003 | Gettemy |
| 2003/0160155 A1 | 8/2003 | Liess |
| 2003/0210537 A1 | 11/2003 | Engelmann |
| 2003/0214486 A1 | 11/2003 | Roberts |
| 2004/0027339 A1 | 2/2004 | Schulz |
| 2004/0032401 A1 | 2/2004 | Nakazawa et al. |
| 2004/0090432 A1 | 5/2004 | Takahashi et al. |
| 2004/0130338 A1 | 7/2004 | Wang et al. |
| 2004/0174541 A1 | 9/2004 | Freifeld |
| 2004/0201579 A1 | 10/2004 | Graham |
| 2004/0212603 A1 | 10/2004 | Cok |
| 2004/0238627 A1 | 12/2004 | Silverbrook et al. |
| 2004/0239702 A1 | 12/2004 | Kang et al. |
| 2004/0245438 A1 | 12/2004 | Payne et al. |
| 2004/0252091 A1 | 12/2004 | Ma et al. |
| 2004/0252867 A1 | 12/2004 | Lan et al. |
| 2005/0012714 A1 | 1/2005 | Russo et al. |
| 2005/0041013 A1 | 2/2005 | Tanaka |
| 2005/0057903 A1 | 3/2005 | Choi |
| 2005/0073508 A1 | 4/2005 | Pittel et al. |
| 2005/0083293 A1 | 4/2005 | Dixon |
| 2005/0128190 A1 | 6/2005 | Ryynanen |
| 2005/0143923 A1 | 6/2005 | Keers et al. |
| 2005/0156914 A1 | 7/2005 | Lipman et al. |
| 2005/0162398 A1 | 7/2005 | Eliasson et al. |
| 2005/0179977 A1 | 8/2005 | Chui et al. |
| 2005/0200613 A1 | 9/2005 | Kobayashi et al. |
| 2005/0212774 A1 | 9/2005 | Ho et al. |
| 2005/0248540 A1 | 11/2005 | Newton |
| 2005/0253834 A1 | 11/2005 | Sakamaki et al. |
| 2005/0276053 A1 | 12/2005 | Nortrup et al. |
| 2006/0001650 A1 | 1/2006 | Robbins et al. |
| 2006/0001653 A1 | 1/2006 | Smits |
| 2006/0007185 A1 | 1/2006 | Kobayashi |
| 2006/0008164 A1 | 1/2006 | Wu et al. |
| 2006/0017706 A1 | 1/2006 | Cutherell et al. |
| 2006/0017709 A1 | 1/2006 | Okano |
| 2006/0033725 A1 | 2/2006 | Marggraff et al. |
| 2006/0038698 A1 | 2/2006 | Chen |
| 2006/0061861 A1 | 3/2006 | Munro et al. |
| 2006/0114237 A1 | 6/2006 | Crockett et al. |
| 2006/0132454 A1 | 6/2006 | Chen et al. |
| 2006/0139340 A1 | 6/2006 | Geaghan |
| 2006/0158437 A1 | 7/2006 | Blythe et al. |
| 2006/0170658 A1 | 8/2006 | Nakamura et al. |
| 2006/0202974 A1 | 9/2006 | Thielman |
| 2006/0227120 A1 | 10/2006 | Eikman |
| 2006/0255248 A1 | 11/2006 | Eliasson |
| 2006/0256092 A1 | 11/2006 | Lee |
| 2006/0279558 A1 | 12/2006 | Van Delden et al. |
| 2006/0281543 A1 | 12/2006 | Sutton et al. |
| 2006/0290684 A1 | 12/2006 | Giraldo et al. |
| 2007/0014486 A1 | 1/2007 | Schiwietz et al. |
| 2007/0024598 A1 | 2/2007 | Miller et al. |
| 2007/0034783 A1 | 2/2007 | Eliasson et al. |
| 2007/0038691 A1 | 2/2007 | Candes et al. |
| 2007/0052684 A1 | 3/2007 | Gruhlke et al. |
| 2007/0070056 A1 | 3/2007 | Sato et al. |
| 2007/0075648 A1 | 4/2007 | Blythe et al. |
| 2007/0120833 A1 | 5/2007 | Yamaguchi et al. |
| 2007/0125937 A1 | 6/2007 | Eliasson et al. |
| 2007/0152985 A1 | 7/2007 | Ostergaard et al. |
| 2007/0201042 A1 | 8/2007 | Eliasson et al. |
| 2007/0296688 A1 | 12/2007 | Nakamura et al. |
| 2008/0006766 A1 | 1/2008 | Oon et al. |
| 2008/0007540 A1 | 1/2008 | Ostergaard |
| 2008/0007541 A1 | 1/2008 | Eliasson et al. |
| 2008/0007542 A1 | 1/2008 | Eliasson et al. |
| 2008/0011944 A1 | 1/2008 | Chua et al. |
| 2008/0029691 A1 | 2/2008 | Han |
| 2008/0036743 A1 | 2/2008 | Westerman et al. |
| 2008/0062150 A1 | 3/2008 | Lee |
| 2008/0068691 A1 | 3/2008 | Miyatake |
| 2008/0074401 A1 | 3/2008 | Chung et al. |
| 2008/0088603 A1 | 4/2008 | Eliasson et al. |
| 2008/0121442 A1 | 5/2008 | Boer et al. |
| 2008/0122792 A1 | 5/2008 | Izadi et al. |
| 2008/0122803 A1 | 5/2008 | Izadi et al. |
| 2008/0130979 A1 | 6/2008 | Run et al. |
| 2008/0150846 A1 | 6/2008 | Chung et al. |
| 2008/0150848 A1 | 6/2008 | Chung et al. |
| 2008/0151126 A1 | 6/2008 | Yu |
| 2008/0158176 A1 | 7/2008 | Land et al. |
| 2008/0189046 A1 | 8/2008 | Eliasson et al. |
| 2008/0192025 A1 | 8/2008 | Jaeger et al. |

(56) References Cited

U.S. PATENT DOCUMENTS

| | | |
|---|---|---|
| 2008/0238433 A1 | 10/2008 | Joutsenoja et al. |
| 2008/0246388 A1 | 10/2008 | Cheon et al. |
| 2008/0252619 A1 | 10/2008 | Crockett et al. |
| 2008/0266266 A1 | 10/2008 | Kent et al. |
| 2008/0278460 A1 | 11/2008 | Arnett et al. |
| 2008/0284925 A1 | 11/2008 | Han |
| 2008/0291668 A1 | 11/2008 | Aylward et al. |
| 2008/0297482 A1 | 12/2008 | Weiss |
| 2009/0000831 A1 | 1/2009 | Miller et al. |
| 2009/0002340 A1 | 1/2009 | Van Genechten |
| 2009/0006292 A1 | 1/2009 | Block |
| 2009/0040786 A1 | 2/2009 | Mori |
| 2009/0066647 A1 | 3/2009 | Kerr et al. |
| 2009/0067178 A1 | 3/2009 | Huang et al. |
| 2009/0073142 A1 | 3/2009 | Yamashita et al. |
| 2009/0077501 A1 | 3/2009 | Partridge et al. |
| 2009/0085894 A1 | 4/2009 | Gandhi et al. |
| 2009/0091554 A1 | 4/2009 | Keam |
| 2009/0115919 A1 | 5/2009 | Tanaka et al. |
| 2009/0122020 A1 | 5/2009 | Eliasson et al. |
| 2009/0122027 A1 | 5/2009 | Newton |
| 2009/0128508 A1 | 5/2009 | Sohn et al. |
| 2009/0135162 A1 | 5/2009 | Van De Wijdeven et al. |
| 2009/0143141 A1 | 6/2009 | Wells et al. |
| 2009/0153519 A1 | 6/2009 | Suarez Rovere |
| 2009/0161026 A1 | 6/2009 | Wu et al. |
| 2009/0168459 A1 | 7/2009 | Holman et al. |
| 2009/0187842 A1 | 7/2009 | Collins et al. |
| 2009/0189857 A1 | 7/2009 | Benko et al. |
| 2009/0189874 A1 | 7/2009 | Chene et al. |
| 2009/0189878 A1 | 7/2009 | Goertz et al. |
| 2009/0219256 A1 | 9/2009 | Newton |
| 2009/0229892 A1 | 9/2009 | Fisher et al. |
| 2009/0251439 A1 | 10/2009 | Westerman et al. |
| 2009/0256817 A1 | 10/2009 | Perlin et al. |
| 2009/0259967 A1 | 10/2009 | Davidson et al. |
| 2009/0267919 A1 | 10/2009 | Chao et al. |
| 2009/0273794 A1 | 11/2009 | Østergaard et al. |
| 2009/0278816 A1 | 11/2009 | Colson |
| 2009/0297009 A1 | 12/2009 | Xu et al. |
| 2010/0033444 A1 | 2/2010 | Kobayashi |
| 2010/0045629 A1 | 2/2010 | Newton |
| 2010/0060896 A1 | 3/2010 | Van De Wijdeven et al. |
| 2010/0066016 A1 | 3/2010 | Van De Wijdeven et al. |
| 2010/0066704 A1 | 3/2010 | Kasai |
| 2010/0073318 A1 | 3/2010 | Hu et al. |
| 2010/0078545 A1 | 4/2010 | Leong et al. |
| 2010/0079407 A1 | 4/2010 | Suggs et al. |
| 2010/0079408 A1 | 4/2010 | Leong et al. |
| 2010/0097345 A1 | 4/2010 | Jang et al. |
| 2010/0097348 A1 | 4/2010 | Park et al. |
| 2010/0097353 A1 | 4/2010 | Newton |
| 2010/0125438 A1 | 5/2010 | Audet |
| 2010/0127975 A1 | 5/2010 | Jensen |
| 2010/0134435 A1 | 6/2010 | Kimura et al. |
| 2010/0142823 A1 | 6/2010 | Wang et al. |
| 2010/0187422 A1 | 7/2010 | Kothari et al. |
| 2010/0193259 A1 | 8/2010 | Wassvik |
| 2010/0229091 A1 | 9/2010 | Homma et al. |
| 2010/0238139 A1 | 9/2010 | Goertz et al. |
| 2010/0245292 A1 | 9/2010 | Wu |
| 2010/0265170 A1 | 10/2010 | Norieda |
| 2010/0277436 A1 | 11/2010 | Feng et al. |
| 2010/0283785 A1 | 11/2010 | Satulovsky |
| 2010/0284596 A1 | 11/2010 | Miao et al. |
| 2010/0289754 A1 | 11/2010 | Sleeman et al. |
| 2010/0295821 A1 | 11/2010 | Chang et al. |
| 2010/0302196 A1 | 12/2010 | Han et al. |
| 2010/0302209 A1 | 12/2010 | Large |
| 2010/0302210 A1 | 12/2010 | Han et al. |
| 2010/0302240 A1 | 12/2010 | Lettvin |
| 2010/0315379 A1 | 12/2010 | Allard et al. |
| 2010/0321328 A1 | 12/2010 | Chang et al. |
| 2010/0322550 A1 | 12/2010 | Trott |
| 2011/0043490 A1 | 2/2011 | Powell et al. |
| 2011/0049388 A1 | 3/2011 | Delaney et al. |
| 2011/0050649 A1 | 3/2011 | Newton et al. |
| 2011/0051394 A1 | 3/2011 | Bailey |
| 2011/0068256 A1 | 3/2011 | Hong et al. |
| 2011/0069039 A1 | 3/2011 | Lee et al. |
| 2011/0069807 A1 | 3/2011 | Dennerlein et al. |
| 2011/0074725 A1 | 3/2011 | Westerman et al. |
| 2011/0074734 A1 | 3/2011 | Wassvik et al. |
| 2011/0074735 A1 | 3/2011 | Wassvik et al. |
| 2011/0084939 A1 | 4/2011 | Gepner et al. |
| 2011/0090176 A1 | 4/2011 | Christiansson et al. |
| 2011/0102374 A1 | 5/2011 | Wassvik et al. |
| 2011/0115748 A1 | 5/2011 | Xu |
| 2011/0121323 A1 | 5/2011 | Wu et al. |
| 2011/0122075 A1 | 5/2011 | Seo et al. |
| 2011/0122091 A1 | 5/2011 | King et al. |
| 2011/0122094 A1 | 5/2011 | Tsang et al. |
| 2011/0134079 A1 | 6/2011 | Stark |
| 2011/0147569 A1 | 6/2011 | Drumm |
| 2011/0157095 A1 | 6/2011 | Drumm |
| 2011/0157096 A1 | 6/2011 | Drumm |
| 2011/0163996 A1 | 7/2011 | Wassvik et al. |
| 2011/0163997 A1 | 7/2011 | Kim |
| 2011/0163998 A1 | 7/2011 | Goertz et al. |
| 2011/0169780 A1 | 7/2011 | Goertz et al. |
| 2011/0175852 A1 | 7/2011 | Goertz et al. |
| 2011/0205186 A1 | 8/2011 | Newton et al. |
| 2011/0216042 A1 | 9/2011 | Wassvik et al. |
| 2011/0221705 A1 | 9/2011 | Yi et al. |
| 2011/0221997 A1 | 9/2011 | Kim et al. |
| 2011/0227036 A1 | 9/2011 | Vaufrey |
| 2011/0227874 A1 | 9/2011 | Fåhraeus et al. |
| 2011/0234537 A1 | 9/2011 | Kim et al. |
| 2011/0254864 A1 | 10/2011 | Tsuchikawa et al. |
| 2011/0261020 A1 | 10/2011 | Song et al. |
| 2011/0267296 A1 | 11/2011 | Noguchi et al. |
| 2011/0291989 A1 | 12/2011 | Lee |
| 2011/0298743 A1 | 12/2011 | Machida et al. |
| 2011/0309325 A1 | 12/2011 | Park et al. |
| 2011/0310045 A1 | 12/2011 | Toda et al. |
| 2012/0019448 A1 | 1/2012 | Pitkanen et al. |
| 2012/0026408 A1 | 2/2012 | Lee et al. |
| 2012/0038593 A1 | 2/2012 | Rönkä et al. |
| 2012/0062474 A1 | 3/2012 | Weishaupt et al. |
| 2012/0068973 A1 | 3/2012 | Christiansson et al. |
| 2012/0086673 A1 | 4/2012 | Chien et al. |
| 2012/0089348 A1 | 4/2012 | Perlin et al. |
| 2012/0110447 A1 | 5/2012 | Chen |
| 2012/0131490 A1 | 5/2012 | Lin et al. |
| 2012/0141001 A1 | 6/2012 | Zhang et al. |
| 2012/0146930 A1 | 6/2012 | Lee |
| 2012/0153134 A1 | 6/2012 | Bergström et al. |
| 2012/0154338 A1 | 6/2012 | Bergström et al. |
| 2012/0162142 A1 | 6/2012 | Christiansson et al. |
| 2012/0162144 A1 | 6/2012 | Fåhraeus et al. |
| 2012/0169672 A1 | 7/2012 | Christiansson |
| 2012/0181419 A1 | 7/2012 | Momtahan |
| 2012/0182266 A1 | 7/2012 | Han |
| 2012/0188206 A1 | 7/2012 | Sparf et al. |
| 2012/0191993 A1 | 7/2012 | Drader et al. |
| 2012/0200532 A1 | 8/2012 | Powell et al. |
| 2012/0200538 A1 | 8/2012 | Christiansson et al. |
| 2012/0212441 A1 | 8/2012 | Christiansson et al. |
| 2012/0217882 A1 | 8/2012 | Wong et al. |
| 2012/0218229 A1 | 8/2012 | Drumm |
| 2012/0249478 A1 | 10/2012 | Chang et al. |
| 2012/0256882 A1 | 10/2012 | Christiansson et al. |
| 2012/0268403 A1 | 10/2012 | Christiansson |
| 2012/0268427 A1 | 10/2012 | Slobodin |
| 2012/0274559 A1 | 11/2012 | Mathai et al. |
| 2012/0305755 A1 | 12/2012 | Hong et al. |
| 2012/0313865 A1 | 12/2012 | Pearce |
| 2013/0021300 A1 | 1/2013 | Wassvik |
| 2013/0021302 A1 | 1/2013 | Drumm |
| 2013/0027404 A1 | 1/2013 | Sarnoff |
| 2013/0044073 A1 | 2/2013 | Christiansson et al. |
| 2013/0055080 A1 | 2/2013 | Komer et al. |
| 2013/0076697 A1 | 3/2013 | Goertz et al. |
| 2013/0082980 A1 | 4/2013 | Gruhlke et al. |

(56) References Cited

U.S. PATENT DOCUMENTS

| | | |
|---|---|---|
| 2013/0106709 A1 | 5/2013 | Simmons |
| 2013/0107569 A1 | 5/2013 | Suganuma |
| 2013/0113715 A1 | 5/2013 | Grant et al. |
| 2013/0120320 A1 | 5/2013 | Liu et al. |
| 2013/0125016 A1 | 5/2013 | Pallakoff et al. |
| 2013/0127790 A1 | 5/2013 | Wassvik |
| 2013/0135258 A1 | 5/2013 | King et al. |
| 2013/0135259 A1 | 5/2013 | King et al. |
| 2013/0141388 A1 | 6/2013 | Ludwig et al. |
| 2013/0141395 A1 | 6/2013 | Holmgren et al. |
| 2013/0154983 A1 | 6/2013 | Christiansson et al. |
| 2013/0155027 A1 | 6/2013 | Holmgren et al. |
| 2013/0181896 A1 | 7/2013 | Gruhlke et al. |
| 2013/0181953 A1 | 7/2013 | Hinckley et al. |
| 2013/0187891 A1 | 7/2013 | Eriksson et al. |
| 2013/0201142 A1 | 8/2013 | Suarez Rovere |
| 2013/0222346 A1 | 8/2013 | Chen et al. |
| 2013/0241887 A1 | 9/2013 | Sharma |
| 2013/0249833 A1 | 9/2013 | Christiansson et al. |
| 2013/0269867 A1 | 10/2013 | Trott |
| 2013/0275082 A1 | 10/2013 | Follmer et al. |
| 2013/0285920 A1 | 10/2013 | Colley |
| 2013/0285968 A1 | 10/2013 | Christiansson et al. |
| 2013/0300716 A1 | 11/2013 | Craven-Bartle et al. |
| 2013/0307795 A1 | 11/2013 | Suarez Rovere |
| 2013/0342490 A1 | 12/2013 | Wallander et al. |
| 2014/0002400 A1 | 1/2014 | Christiansson et al. |
| 2014/0028575 A1 | 1/2014 | Parivar et al. |
| 2014/0028604 A1 | 1/2014 | Morinaga et al. |
| 2014/0028629 A1 | 1/2014 | Drumm et al. |
| 2014/0036203 A1 | 2/2014 | Guillou et al. |
| 2014/0055421 A1 | 2/2014 | Christiansson et al. |
| 2014/0063853 A1 | 3/2014 | Nichol et al. |
| 2014/0071653 A1 | 3/2014 | Thompson et al. |
| 2014/0085241 A1 | 3/2014 | Christiansson et al. |
| 2014/0092052 A1 | 4/2014 | Grunthaner et al. |
| 2014/0098032 A1 | 4/2014 | Ng et al. |
| 2014/0098058 A1 | 4/2014 | Baharav et al. |
| 2014/0109219 A1 | 4/2014 | Rohrweck et al. |
| 2014/0125633 A1 | 5/2014 | Fåhraeus et al. |
| 2014/0160762 A1 | 6/2014 | Dudik et al. |
| 2014/0192023 A1 | 7/2014 | Hoffman |
| 2014/0232669 A1 | 8/2014 | Ohlsson et al. |
| 2014/0237401 A1 | 8/2014 | Krus et al. |
| 2014/0237408 A1 | 8/2014 | Ohlsson et al. |
| 2014/0237422 A1 | 8/2014 | Ohlsson et al. |
| 2014/0253520 A1 | 9/2014 | Cueto et al. |
| 2014/0253831 A1 | 9/2014 | Craven-Bartle |
| 2014/0259029 A1 | 9/2014 | Choi et al. |
| 2014/0267124 A1 | 9/2014 | Christiansson et al. |
| 2014/0292701 A1 | 10/2014 | Christiansson et al. |
| 2014/0300572 A1 | 10/2014 | Ohlsson et al. |
| 2014/0320460 A1 | 10/2014 | Johansson et al. |
| 2014/0347325 A1 | 11/2014 | Wallander et al. |
| 2014/0362046 A1 | 12/2014 | Yoshida |
| 2014/0368471 A1 | 12/2014 | Christiansson et al. |
| 2014/0375607 A1 | 12/2014 | Christiansson et al. |
| 2015/0002386 A1 | 1/2015 | Mankowski et al. |
| 2015/0009687 A1 | 1/2015 | Lin |
| 2015/0015497 A1 | 1/2015 | Leigh |
| 2015/0035774 A1 | 2/2015 | Christiansson et al. |
| 2015/0035803 A1 | 2/2015 | Wassvik et al. |
| 2015/0053850 A1 | 2/2015 | Uvnäs |
| 2015/0054759 A1 | 2/2015 | Christiansson et al. |
| 2015/0083891 A1 | 3/2015 | Wallander |
| 2015/0103013 A9 | 4/2015 | Huang |
| 2015/0121691 A1 | 5/2015 | Wang |
| 2015/0130769 A1 | 5/2015 | Björklund |
| 2015/0138105 A1 | 5/2015 | Christiansson et al. |
| 2015/0138158 A1 | 5/2015 | Wallander et al. |
| 2015/0138161 A1 | 5/2015 | Wassvik |
| 2015/0205441 A1 | 7/2015 | Bergström et al. |
| 2015/0215450 A1 | 7/2015 | Seo et al. |
| 2015/0242055 A1 | 8/2015 | Wallander |
| 2015/0286698 A1 | 10/2015 | Gagnier et al. |
| 2015/0317036 A1 | 11/2015 | Johansson et al. |
| 2015/0324028 A1 | 11/2015 | Wassvik et al. |
| 2015/0331544 A1 | 11/2015 | Bergström et al. |
| 2015/0331545 A1 | 11/2015 | Wassvik et al. |
| 2015/0331546 A1 | 11/2015 | Craven-Bartle et al. |
| 2015/0331547 A1 | 11/2015 | Wassvik et al. |
| 2015/0332655 A1 | 11/2015 | Krus et al. |
| 2015/0346856 A1 | 12/2015 | Wassvik |
| 2015/0346911 A1* | 12/2015 | Christiansson ....... G06F 3/0421 345/175 |
| 2015/0363042 A1 | 12/2015 | Krus et al. |
| 2016/0004898 A1 | 1/2016 | Holz |
| 2016/0026337 A1 | 1/2016 | Wassvik et al. |
| 2016/0034099 A1 | 2/2016 | Christiansson et al. |
| 2016/0050746 A1 | 2/2016 | Wassvik et al. |
| 2016/0070415 A1 | 3/2016 | Christiansson et al. |
| 2016/0070416 A1 | 3/2016 | Wassvik |
| 2016/0117019 A1 | 4/2016 | Michiaki |
| 2016/0124546 A1 | 5/2016 | Chen et al. |
| 2016/0124551 A1 | 5/2016 | Christiansson et al. |
| 2016/0077616 A1 | 6/2016 | Durojaiye et al. |
| 2016/0154531 A1 | 6/2016 | Wall |
| 2016/0202841 A1 | 7/2016 | Christiansson et al. |
| 2016/0216844 A1 | 7/2016 | Bergström |
| 2016/0224144 A1 | 8/2016 | Klinghult et al. |
| 2016/0299583 A1 | 10/2016 | Watanabe |
| 2016/0299593 A1 | 10/2016 | Christiansson et al. |
| 2016/0328090 A1 | 11/2016 | Klinghult |
| 2016/0328091 A1 | 11/2016 | Wassvik et al. |
| 2016/0334942 A1 | 11/2016 | Wassvik |
| 2016/0342282 A1 | 11/2016 | Wassvik |
| 2016/0357348 A1 | 12/2016 | Wallander |
| 2017/0010688 A1 | 1/2017 | Fahraeus et al. |
| 2017/0090090 A1 | 3/2017 | Craven-Bartle et al. |
| 2017/0102827 A1 | 4/2017 | Christiansson et al. |
| 2017/0115235 A1 | 4/2017 | Ohlsson et al. |
| 2017/0139541 A1 | 5/2017 | Christiansson et al. |
| 2017/0177163 A1 | 6/2017 | Wallander et al. |
| 2017/0185230 A1 | 6/2017 | Wallander et al. |
| 2017/0293392 A1 | 10/2017 | Christiansson et al. |
| 2017/0344185 A1 | 11/2017 | Ohlsson et al. |
| 2018/0031753 A1 | 2/2018 | Craven-Bartle et al. |
| 2018/0129354 A1 | 5/2018 | Christiansson et al. |
| 2018/0210572 A1 | 7/2018 | Wallander et al. |
| 2018/0225006 A1 | 8/2018 | Wall |
| 2018/0253187 A1 | 9/2018 | Christiansson et al. |
| 2018/0267672 A1 | 9/2018 | Wassvik et al. |
| 2018/0275788 A1 | 9/2018 | Christiansson et al. |
| 2018/0275830 A1 | 9/2018 | Christiansson et al. |
| 2018/0275831 A1 | 9/2018 | Christiansson et al. |
| 2019/0050074 A1 | 2/2019 | Kocovski |

FOREIGN PATENT DOCUMENTS

| | | |
|---|---|---|
| CN | 101644854 A | 2/2010 |
| CN | 201437963 U | 4/2010 |
| CN | 201 465 071 U | 5/2010 |
| CN | 101019071 B | 6/2012 |
| CN | 101206550 B | 6/2012 |
| CN | 203 189 466 U | 9/2013 |
| CN | 203 224 848 U | 10/2013 |
| CN | 101075168 B | 4/2014 |
| CN | 205 015 574 U | 2/2016 |
| DE | 3511330 C2 | 5/1988 |
| DE | 68902419 T2 | 3/1993 |
| DE | 69000920 T2 | 6/1993 |
| DE | 19809934 A1 | 9/1999 |
| DE | 10026201 A1 | 12/2000 |
| DE | 102010000473 A1 | 8/2010 |
| EP | 0845812 B1 | 6/1998 |
| EP | 0600576 B1 | 10/1998 |
| EP | 1798630 A2 | 6/2007 |
| EP | 0897161 B1 | 10/2007 |
| EP | 2088501 A1 | 8/2009 |
| EP | 1512989 B1 | 9/2009 |
| EP | 2077490 A3 | 1/2010 |
| EP | 1126236 B1 | 12/2010 |
| EP | 2314203 A1 | 4/2011 |
| EP | 2339437 A3 | 10/2011 |

(56) References Cited

FOREIGN PATENT DOCUMENTS

| | | |
|---|---|---|
| EP | 2442180 A1 | 4/2012 |
| EP | 2466429 A1 | 6/2012 |
| EP | 2479642 A1 | 7/2012 |
| EP | 1457870 B1 | 8/2012 |
| EP | 2778849 A1 | 9/2014 |
| EP | 2515216 A1 | 3/2016 |
| FR | 2172828 A1 | 10/1973 |
| FR | 2617619 B1 | 1/1990 |
| FR | 2614711 B1 | 3/1992 |
| FR | 2617620 B1 | 9/1992 |
| FR | 2676275 A1 | 11/1992 |
| GB | 1380144 A | 1/1975 |
| GB | 2131544 B | 3/1986 |
| GB | 2204126 A | 11/1988 |
| JP | 2000506655 A | 5/2000 |
| JP | 2000172438 A | 6/2000 |
| JP | 2000259334 A | 9/2000 |
| JP | 2000293311 A | 10/2000 |
| JP | 2003330603 A | 11/2003 |
| JP | 2005004278 A | 1/2005 |
| JP | 2008506173 A | 2/2008 |
| JP | 2011530124 A | 12/2011 |
| KR | 100359400 | 7/2001 |
| KR | 100940435 | 2/2010 |
| WO | WO 1984/003186 A1 | 8/1984 |
| WO | WO 1999/046602 A1 | 9/1999 |
| WO | WO 01/127867 A1 | 4/2001 |
| WO | WO 01/84251 A2 | 11/2001 |
| WO | WO 02/35460 A1 | 5/2002 |
| WO | WO 02/077915 A2 | 10/2002 |
| WO | WO 02/095668 A1 | 11/2002 |
| WO | WO 03/076870 A1 | 9/2003 |
| WO | WO 2004/081502 A2 | 9/2004 |
| WO | WO 2004/081956 A2 | 9/2004 |
| WO | WO 2005/026938 A2 | 3/2005 |
| WO | WO 2005/029172 A2 | 3/2005 |
| WO | WO 2005/029395 A2 | 3/2005 |
| WO | WO 2005/125011 A1 | 12/2005 |
| WO | WO 2006/095320 A2 | 9/2006 |
| WO | WO 2006/124551 A2 | 11/2006 |
| WO | WO 2007/003196 A2 | 1/2007 |
| WO | WO 2007/058924 A2 | 5/2007 |
| WO | WO 2007/112742 A1 | 10/2007 |
| WO | WO 2008/004103 A2 | 1/2008 |
| WO | WO 2008/007276 A2 | 1/2008 |
| WO | WO 2008/017077 A2 | 2/2008 |
| WO | WO 2008/034184 A1 | 3/2008 |
| WO | WO 2008/039006 A1 | 4/2008 |
| WO | WO 2008/068607 A2 | 6/2008 |
| WO | WO 2006/124551 B1 | 7/2008 |
| WO | WO 2008/017077 A4 | 2/2009 |
| WO | WO 2009/048365 A1 | 4/2009 |
| WO | WO 2009/077962 A2 | 6/2009 |
| WO | WO 2009/102681 A2 | 8/2009 |
| WO | WO 2009/137355 A2 | 11/2009 |
| WO | WO 2010/006882 A2 | 1/2010 |
| WO | WO 2010/006883 A2 | 1/2010 |
| WO | WO 2010/006884 A2 | 1/2010 |
| WO | WO 2010/006885 A2 | 1/2010 |
| WO | WO 2010/006886 A2 | 1/2010 |
| WO | WO 2010/015408 A1 | 2/2010 |
| WO | WO 2010/046539 A1 | 4/2010 |
| WO | WO 2010/056177 A1 | 5/2010 |
| WO | WO 2010/064983 A2 | 6/2010 |
| WO | WO 2010/081702 A2 | 7/2010 |
| WO | WO 2010/112404 A1 | 10/2010 |
| WO | WO 2010/123809 A2 | 10/2010 |
| WO | WO 2010/134865 A1 | 11/2010 |
| WO | WO 2011/028169 A1 | 3/2011 |
| WO | WO 2011/028170 A1 | 3/2011 |
| WO | WO 2011/049511 A1 | 4/2011 |
| WO | WO 2011/049512 A1 | 4/2011 |
| WO | WO 2011/049513 A1 | 4/2011 |
| WO | WO 2011/057572 A1 | 5/2011 |
| WO | WO 2011/078769 A1 | 6/2011 |
| WO | WO 2011/082477 A1 | 7/2011 |
| WO | WO 2011/139213 A1 | 11/2011 |
| WO | WO 2012/002894 A1 | 1/2012 |
| WO | WO 2012/010078 A1 | 1/2012 |
| WO | WO 2012/050510 A1 | 4/2012 |
| WO | WO 2012/082055 A1 | 6/2012 |
| WO | WO 2012/105893 A1 | 8/2012 |
| WO | WO 2012/121652 A1 | 9/2012 |
| WO | WO 2012/158105 A2 | 11/2012 |
| WO | WO 2012/172302 A1 | 12/2012 |
| WO | WO 2012/176801 A1 | 12/2012 |
| WO | WO 2013/036192 A1 | 3/2013 |
| WO | WO 2013/048312 A2 | 4/2013 |
| WO | WO 2013/055282 A2 | 4/2013 |
| WO | WO 2013/062471 A2 | 5/2013 |
| WO | WO 2013/089622 A2 | 6/2013 |
| WO | WO 2013/115710 A2 | 8/2013 |
| WO | WO 2013/133756 A1 | 9/2013 |
| WO | WO 2013/133757 A2 | 9/2013 |
| WO | WO 2013/176613 A2 | 11/2013 |
| WO | WO 2013/176614 A2 | 11/2013 |
| WO | WO 2013/176615 A2 | 11/2013 |
| WO | WO 2014/055809 A1 | 4/2014 |
| WO | WO 2014/086084 A1 | 6/2014 |
| WO | WO 2014/098744 A1 | 6/2014 |
| WO | WO 2014/104967 A1 | 7/2014 |
| WO | WO 2015/175586 A1 | 11/2015 |
| WO | WO 2018/096430 A1 | 5/2018 |
| WO | WO 2018/106172 A1 | 6/2018 |

OTHER PUBLICATIONS

Chou, N., et al., "Generalized pseudo-polar Fourier grids and applications in regfersting optical coherence tomography images," 43rd Asilomar Conference on Signals, Systems and Computers, Nov. 2009, in 5 pages.

Fihn, M., "Touch Panel—Special Edition," Veritas et Visus, Nov. 2011, in 1 page.

Fourmont, K., "Non-Equispaced Fast Fourier Transforms with Applications to Tomography," Journal of Fourier Analysis and Applications, vol. 9, Issue 5, 2003, in 20 pages.

Iizuka, K., "Boundaries, Near-Field Optics, and Near-Field Imaging," Elements of Photonics, vol. 1: in Free Space and Special Media, Wiley & Sons, 2002, in 57 pages.

Johnson, M., "Enhanced Optical Touch Input Panel", IBM Technical Discolusre Bulletin, 1985, in 3 pages.

Kak, et al., "Principles of Computerized Tomographic Imaging", Institute of Electrical Engineers, Inc., 1999, in 333 pages.

The Laser Wall, MIT, 1997, http://web.media.mit.edu/joep/SpectrumWeb/captions/Laser.html.

Liu, J., et al. "Multiple touch points identifying method, involves starting touch screen, driving specific emission tube, and computing and transmitting coordinate of touch points to computer system by direct lines through interface of touch screen," 2007, in 25 pages.

Natterer, F., "The Mathematics of Computerized Tomography", Society for Industrial and Applied Mathematics, 2001, in 240 pages.

Natterer, F., et al. "Fourier Reconstruction," Mathematical Methods in Image Reconstruction, Society for Industrial and Applied Mathematics, 2001, in 12 pages.

Paradiso, J.A., "Several Sensor Approaches that Retrofit Large Surfaces for Interactivity," ACM Ubicomp 2002 Workshop on Collaboration with Interactive Walls and Tables, 2002, in 8 pages.

Tedaldi, M., et al. "Refractive index mapping of layered samples using optical coherence refractometry," Proceedings of SPIE, vol. 7171, 2009, in 8 pages.

Supplementary European Search Report for European App. No. EP 16759213, dated Oct. 4, 2018, in 9 pages.

Extended European Search Report for European App. No. 16743795.3, dated Sep. 11, 2018, in 5 pages.

International Search Report for International App. No. PCT/SE2017/051224, dated Feb. 23, 2018, in 5 pages.

International Search Report for International App. No. PCT/IB2017/057201, dated Mar. 6, 2018, in 4 pages.

(56) References Cited

OTHER PUBLICATIONS

Extended European Search Report in European Application No. 19165019.1, dated Jul. 18, 2019 in 8 pages.
International Preliminary Report on Patentability received in International Application No. PCT/SE2017/051233, dated Jun. 11, 2019, in 6 pages.
International Search Report for International App. No. PCT/SE2018/050070, dated Apr. 25, 2018, in 4 pages.
Extended European Search Report in European Application No. 17750516.1, dated Jul. 16, 2019 in 5 pages.

* cited by examiner

ERASER FOR TOUCH DISPLAYS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present disclosure relates to techniques for detecting and identifying objects on a touch surface.

Description of the Related Art

To an increasing extent, touch-sensitive panels are being used for providing input data to computers, electronic measurement and test equipment, gaming devices, etc. The panel may be provided with a graphical user interface (GUI) for a user to interact with using e.g. a pointer, stylus or one or more fingers. The GUI may be fixed or dynamic. A fixed GUI may e.g. be in the form of printed matter placed over, under or inside the panel. A dynamic GUI can be provided by a display screen integrated with, or placed underneath, the panel or by an image being projected onto the panel by a projector.

There are numerous known techniques for providing touch sensitivity to the panel, e.g. by using cameras to capture light scattered off the point(s) of touch on the panel, by using cameras to directly observe the objects interacting with the panel, by incorporating resistive wire grids, capacitive sensors, strain gauges, etc. into the panel.

In one category of touch-sensitive panels known as 'above surface optical touch systems' and known from e.g. U.S. Pat. No. 4,459,476, a plurality of optical emitters and optical receivers are arranged around the periphery of a touch surface to create a grid of intersecting light paths (otherwise known as detection lines) above the touch surface. Each light path extends between a respective emitter/receiver pair. An object that touches the touch surface will block or attenuate some of the light paths. Based on the identity of the receivers detecting a blocked light path, a processor can determine the location of the intercept between the blocked light paths.

For most touch systems, a user may place a finger onto the surface of a touch panel to register a touch. Alternatively, a stylus may be used. A stylus is typically a pen shaped object with at least one end configured to be pressed against the surface of the touch panel. An example of a stylus according to the prior art is shown in FIG. 2. Use of a stylus 60 may provide improved selection accuracy and pointer precision over a simple finger touch. This can be due to the engineered stylus tip 62 providing a smaller and/or more regular contact surface with the touch panel than is possible with a human finger. Also, muscular control of an entire hand in a pen holding position can be more precise than a single finger for the purposes of pointer control due to lifelong training in the use of pens and pencils.

PCT/SE2016/051229 describes an optical IR touch sensing apparatus configured to determine a position of a touching object on the touch surface and an attenuation value corresponding to the attenuation of the light resulting from the object touching the touch surface. Using these values, the apparatus can differentiate between different types of objects, including multiple stylus tips, fingers, palms. The differentiation between the object types may be determined by a function that takes into account how the attenuation of a touching object varies across the touch surface, compensating for e.g. light field height, detection line density, detection line angular density etc.

For larger objects applied to the touch surface, such as palms and board erasers, it is possible to use an interaction map of the touch surface to determine an approximate shape of the object. For example, where an optical IR touch sensing apparatus is used, an attenuation map may be generated showing an area on the touch surface where the light is highly attenuated. The shape of an attenuated area may then be used to identify the position and shape of the touching object. In FIG. 5, an example attenuation map of a board eraser is shown. In a technique known according to the prior art, a rough shape of the eraser can be determined by identifying all points with an attenuation above a threshold value. An approximate centroid and orientation of the eraser may then be determined using the image moments of the identified points. Such techniques are described in "Image analysis via the general theory of moments" by Michael Reed Teague. Once the centroid and orientation of the board eraser are determined, width and height of the board eraser can be found by determining the extent of the identified pixels in the direction of the orientation angle and the normal of the orientation angle.

A known problem with this technique is that larger objects placed onto an optical IR touch sensing apparatus, such as those described above, may cause severe distortion to the touch signal. Many systems use a large number of detection lines and a high density detection line grid density across the touch surface to ensure high touch resolution. Whilst a relatively small number of detection lines may be interrupted by a finger or stylus, a larger object, such as a palm or board eraser, may disrupt a relatively large number of detection lines and cause artefacts in the processed touch signal. This may result in a distorted and noisy interaction map, making the position, size, and orientation of the larger object impossible to detect accurately and reliably.

Therefore, what is needed is a way of improving the identification of position, size, and orientation of large objects touching an optical touch system that mitigates the above problem.

SUMMARY OF THE INVENTION

It is an objective of the disclosure to at least partly overcome one or more of the above-identified limitations of the prior art.

One or more of these objectives, as well as further objectives that may appear from the description below, are at least partly achieved by means of a method for data processing, a computer readable medium, devices for data processing, and a touch-sensing apparatus according to the independent claims, embodiments thereof being defined by the dependent claims.

A first embodiment provides A touch sensing apparatus, comprising: a touch surface, a plurality of emitters, arranged around a periphery of the touch surface, configured to emit a plurality of light beams such that one or more objects touching the touch surface cause an attenuation of at least one of the plurality of light beams; a plurality of detectors, arranged around the periphery of the touch surface, configured to receive light from the plurality of emitters on a plurality of light paths, wherein each detector in the plurality of detectors is arranged to receive light from more than one emitter of the plurality of emitters; and a hardware processor configured to: determine, based on output signals from the plurality of detectors, a plurality of transmission values, each of the plurality of transmission values corresponding to each of the plurality of light paths; determine an object reference point on the touch surface where the light is attenuated or occluded by an object based on the plurality of transmission values; determine one or more unaffected light paths from the plurality of light paths that are not affected by the object based on the plurality of transmission values; determine, from the one or more unaffected light paths that are not affected by the object, one or more object boundary light paths in relation with the object reference point; determine one or more characteristics of the object based on the one or more object boundary light paths.

A method of determining characteristics of an object in contact with a touch surface of a touch sensing apparatus, said touch sensing apparatus comprising: a touch surface, a plurality of emitters arranged around the periphery of the touch surface to emit beams of light such that one or more objects touching the touch surface cause an attenuation of the light; and a plurality of light detectors arranged around the periphery of the touch surface to receive light from the plurality of emitters on a plurality of light paths, wherein each light detector is arranged to receive light from more than one emitter; said method comprising the steps of: determining, based on output signals of the light detectors, a transmission value for each light path; processing the transmission values to determine an object reference point on the touch surface where the light is attenuated or occluded by an object, determining a plurality of light paths unaffected by an object in dependence on the transmission values of the respective light paths, determining, from the plurality of light paths unaffected by an object, a plurality of object boundary light paths comprising one or more light paths passing closest to the object reference point, determining one or more characteristics of the object in dependence on the plurality of object boundary light paths.

BRIEF DESCRIPTION OF THE DRAWINGS

Embodiments of the invention will now be described in more detail with reference to the accompanying schematic drawings.

DETAILED DESCRIPTION OF THE PREFERRED EMBODIMENT

Figure 1:
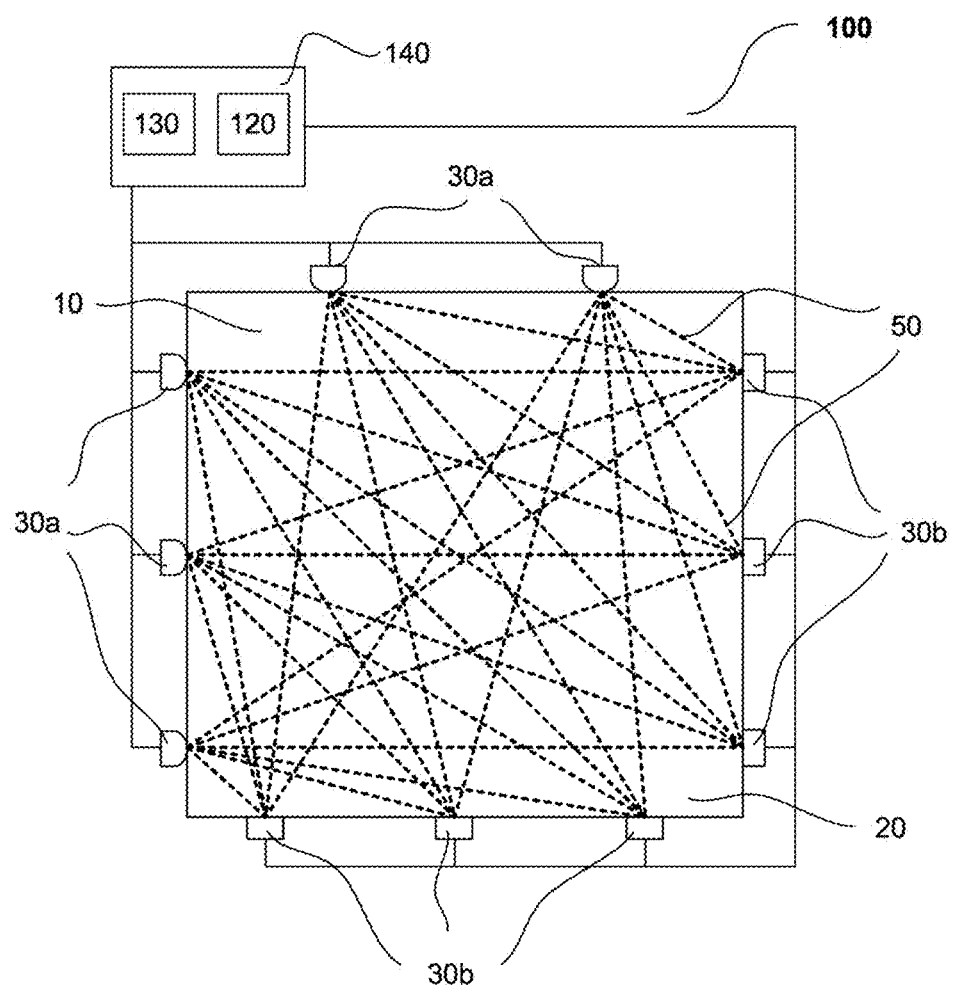
FIG. 1 is a top plan view of an optical touch apparatus.

The present disclosure relates to optical touch panels and the use of techniques for providing touch sensitivity to a display apparatus. Throughout the description the same reference numerals are used to identify corresponding elements.

In addition to having its ordinary meaning, the following terms can also mean:

A "touch object" or "touching object" is a physical object that touches, or is brought in sufficient proximity to, a touch surface so as to be detected by one or more sensors in the touch system. The physical object may be animate or inanimate.

An "interaction" occurs when the touch object affects a parameter measured by the sensor.

A "touch" denotes a point of interaction as seen in the interaction pattern.

A "light field" is the light flowing between an emitter and a corresponding detector. Although an emitter may generate a large amount of light in many directions, only the light measured by a detector from an emitter defines the light field for the emitter and detector.

Figure 2:
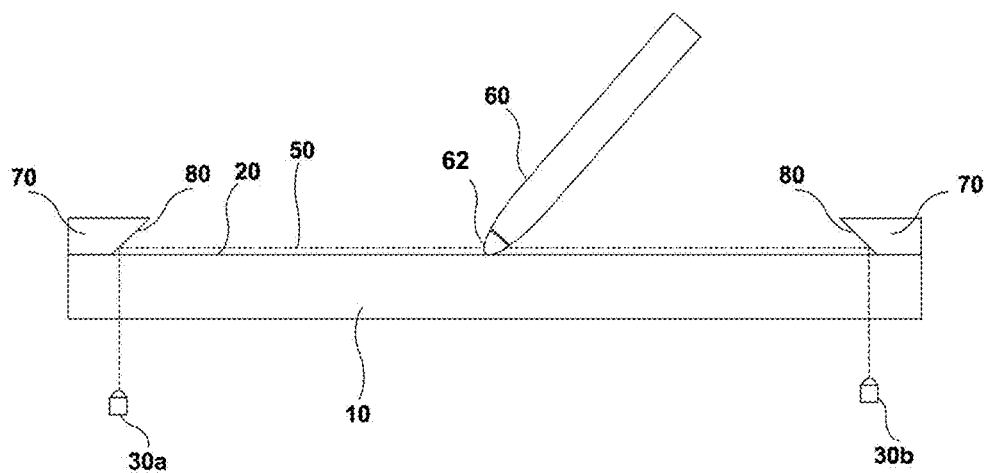
FIG. 2 shows a cross-section of an IR optical touch apparatus according to the prior art.
Figure 3:
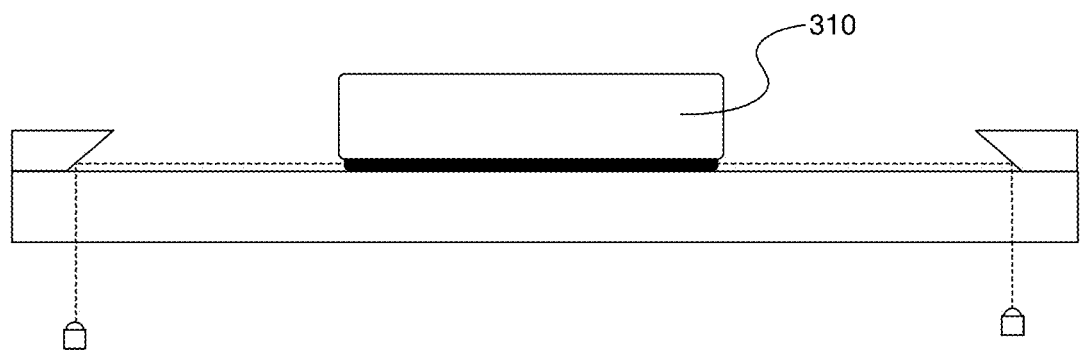
FIG. 3 shows a cross-section of an IR optical touch apparatus with a board eraser object applied to the touch surface.

FIG. 1 is a top plan view of an optical touch apparatus which may correspond to the IR optical touch apparatus of FIG. 2. Emitters 30a are distributed around the periphery of touch surface 20, to project light across the touch surface 20 of touch panel 10. Detectors 30b are distributed around the periphery of touch surface 20, to receive part of the propagating light. The light from each of emitters 30a will thereby propagate to a number of different detectors 30b on a plurality of light paths 50.

FIG. 2 shows a cross-section of an IR optical touch apparatus according to the prior art. In the example apparatus shown in FIG. 2, object 60 will attenuate light propagating along at least one light path 50. In the example shown of FIG. 2, object 60 may even fully occlude the light on at least one light path 50.

Light paths 50 may conceptually be represented as "detection lines" that extend across the touch surface 20 to the periphery of touch surface 20 between pairs of emitters 30a and detectors 30b, as shown in FIG. 1. Thus, the detection lines 50 correspond to a projection of the light paths 50 onto the touch surface 20. Thereby, the emitters 30a and detectors 30b collectively define a grid of detection lines 50 ("detection grid") on the touch surface 20, as seen in the top plan view of FIG. 1. The spacing of intersections in the detection grid defines the spatial resolution of the touch-sensitive apparatus 100, i.e. the smallest object that can be detected on the touch surface 20. The width of the detection line is a function of the width of the emitters and corresponding detectors. A wide detector detecting light from a wide emitter provides a wide detection line with a broader surface coverage, minimising the space in between detection lines which provide no touch coverage. A disadvantage of broad detection lines may be the reduced touch precision, worse point separation, and lower signal to noise ratio.

As used herein, the emitters 30a may be any type of device capable of emitting radiation in a desired wavelength range, for example a diode laser, a VCSEL (vertical-cavity surface-emitting laser), an LED (light-emitting diode), an incandescent lamp, a halogen lamp, etc. The emitters 30a may also be formed by the end of an optical fibre. The emitters 30*a* may generate light in any wavelength range. The following examples presume that the light is generated in the infrared (IR), i.e. at wavelengths above about 750 nm. Analogously, the detectors 30*b* may be any device capable of converting light (in the same wavelength range) into an electrical signal, such as a photo-detector, a CCD device, a CMOS device, etc.

The detectors 30*b* collectively provide an output signal, which is received and sampled by a signal processor 140. The output signal contains a number of sub-signals, also denoted "transmission values", each representing the energy of light received by one of light detectors 30*b* from one of light emitters 30*a*. Depending on implementation, the signal processor 140 may need to process the output signal for separation of the individual transmission values. The transmission values represent the received energy, intensity or power of light received by the detectors 30*b* on the individual detection lines 50. Whenever an object touches a detection line 50, the received energy on this detection line is decreased or "attenuated". Where an object blocks the entire width of the detection line of an above-surface system, the detection line will be fully attenuated or occluded.

In an embodiment, the touch apparatus is arranged according to FIG. 2. A light emitted by emitters 30*a* is transmitted through transmissive panel 10 in a manner that does not cause the light to TIR within transmissive panel 10. Instead, the light exits transmissive panel 10 through touch surface 20 and is reflected by reflector surface 80 of edge reflector 70 to travel along a path 50 in a plane parallel with touch surface 20. The light will then continue until deflected by reflector surface 80 of the edge reflector 70 at an opposing or adjacent edge of the transmissive panel 10, wherein the light will be deflected back down through transmissive panel 10 and onto detectors 30*b*. An object 60 (optionally having object tip 62) touching surface 20 will occlude light paths 50 that intersect with the location of the object on the surface resulting in an attenuated light signal received at detector 30*b*.

In an embodiment, the top edge of reflector surface 80 is 2 mm above touch surface 20. This results in a light field 90 which is 2 mm deep. A 2 mm deep field is advantageous for this embodiment as it minimizes the distance that the object needs to travel into the light field to reach the touch surface and to maximally attenuate the light. The smaller the distance, the shorter time between the object entering the light field and contacting the surface. This is particularly advantageous for differentiating between large objects entering the light field slowly and small objects entering the light field quickly. A large object entering the light field will initially cause a similar attenuation as a smaller object fully extended into the light field. The shorter distance for the objects to travel, the fewer frames are required before a representative attenuation signal for each object can be observed. This effect is particularly apparent when the light field is between 0.5 mm and 2 mm deep.

In an alternative embodiment, the transmitted light illuminates a touch surface 20 from within the panel 10. The panel 10 is made of solid material in one or more layers and may have any shape. The panel 10 defines an internal radiation propagation channel, in which light propagates by internal reflections. The propagation channel is defined between the boundary surfaces of the panel 10, where the top surface allows the propagating light to interact with touching objects 7 and thereby defines the touch surface 20. This is achieved by injecting the light into the panel 10 such that the light is reflected by total internal reflection (TIR) in the touch surface 20 as it propagates through the panel 10. The light may be reflected by TIR in the bottom surface or against a reflective coating thereon. In this embodiment, an object 7 may be brought in contact with the touch surface 20 to interact with the propagating light at the point of touch. In this interaction, part of the light may be scattered by the object 7, part of the light may be absorbed by the object 7, and part of the light may continue to propagate in its original direction across the panel 10. Thus, the touching object 7 causes a local frustration of the total internal reflection, which leads to a decrease in the energy (or, equivalently, power or intensity) of the transmitted light.

The signal processor 140 may be configured to process the transmission values so as to determine a property of the touching objects, such as a position (e.g. in a x,y coordinate system), a shape, or an area. This determination may involve a straight-forward triangulation based on the attenuated detection lines, e.g. as disclosed in U.S. Pat. No. 7,432,893 and WO2010/015408, or a more advanced processing to recreate a distribution of attenuation values (for simplicity, referred to as an "attenuation pattern") across the touch surface 20, where each attenuation value represents a local degree of light attenuation. The attenuation pattern may be further processed by the signal processor 140 or by a separate device (not shown) for determination of a position, shape or area of touching objects. The attenuation pattern may be generated e.g. by any available algorithm for image reconstruction based on transmission values, including tomographic reconstruction methods such as Filtered Back Projection, FFT-based algorithms, ART (Algebraic Reconstruction Technique), SART (Simultaneous Algebraic Reconstruction Technique), etc. Alternatively, the attenuation pattern may be generated by adapting one or more basis functions and/or by statistical methods such as Bayesian inversion. Examples of such reconstruction functions designed for use in touch determination are found in WO2009/077962, WO2011/049511, WO2011/139213, WO2012/050510, and WO2013/062471, all of which are incorporated herein by reference.

For the purposes of brevity, the term 'signal processor' is used throughout to describe one or more processing components for performing the various stages of processing required between receiving the signal from the detectors through to outputting a determination of touch including touch co-ordinates, touch properties, etc. Although the processing stages of the present disclosure may be carried out on a single processing unit (with a corresponding memory unit), the disclosure is also intended to cover multiple processing units and even remotely located processing units. In an embodiment, the signal processor 140 can include one or more hardware processors 130 and a memory 120. The hardware processors can include, for example, one or more computer processing units. The hardware processor can also include microcontrollers and/or application specific circuitry such as ASICs and FPGAs. The flowcharts and functions discussed herein can be implemented as programming instructions stored, for example, in the memory 120 or a memory of the one or more hardware processors. The programming instructions can be implemented in machine code, C, C++, JAVA, or any other suitable programming languages. The signal processor 140 can execute the programming instructions and accordingly execute the flowcharts and functions discussed herein.

Figure 4:
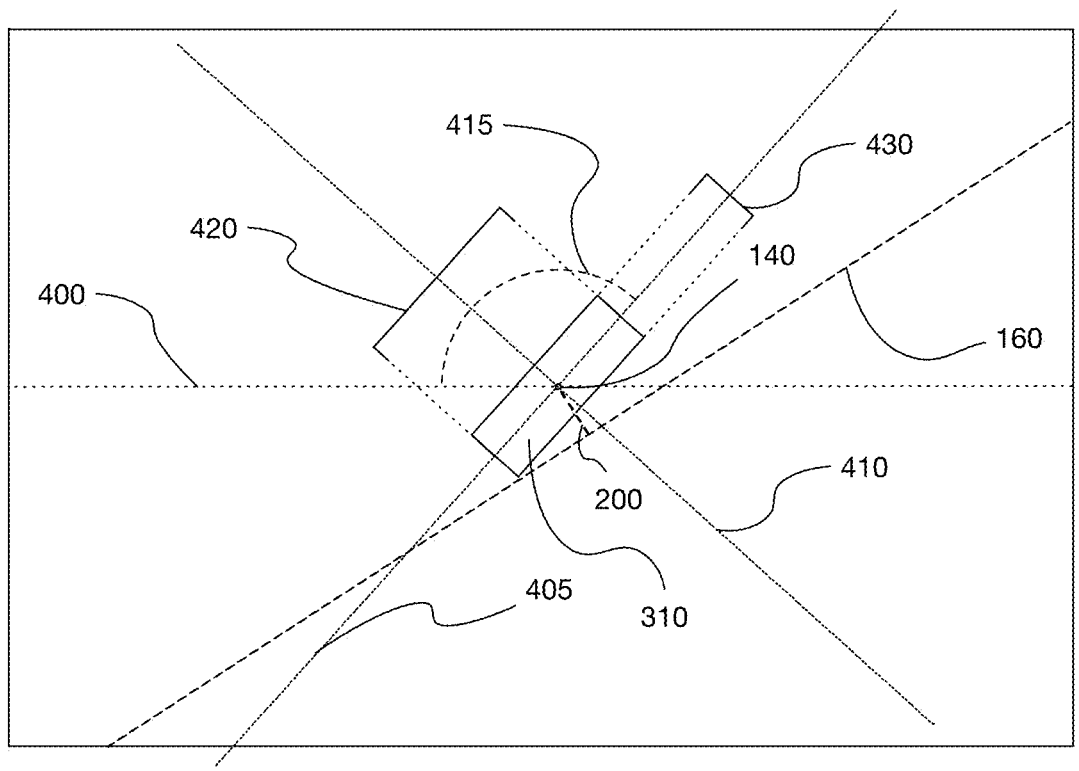
FIG. 4 shows a top-down view of an IR optical touch apparatus with a board eraser object applied to the touch surface.

FIG. 4 shows an example of a rectangular board eraser object 310 as applied to the touch surface. Object 310 has a width 430 and a height 420. The orientation angle of object 310 is determined to be the angle 415 between wide axis 405 and touch surface x-axis 400. As object 310 is a rectangle, narrow axis 410 is perpendicular to wide axis 405.

Figure 5:
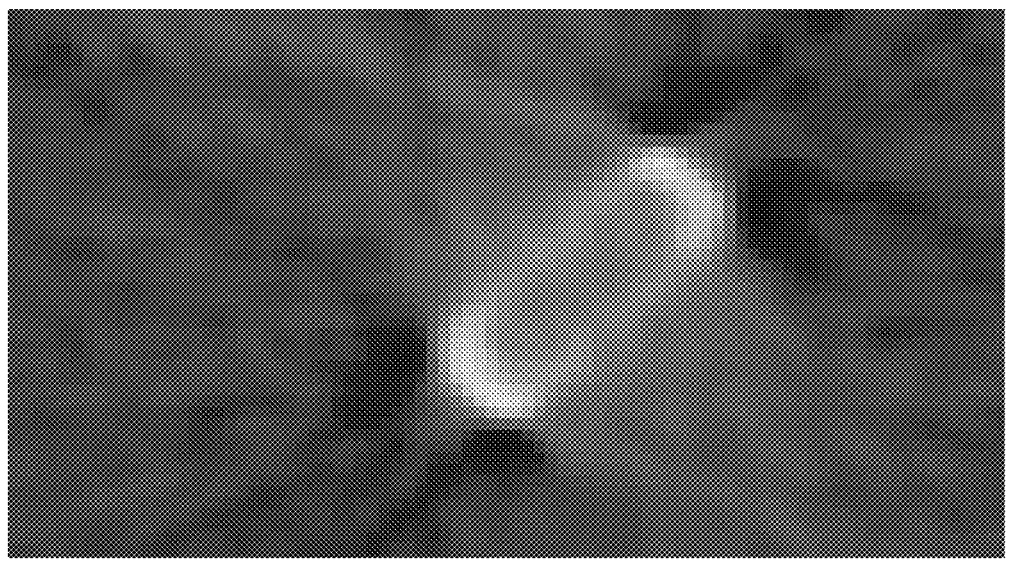
FIG. 5 shows an example interaction map of a board eraser object applied to a touch surface.

FIG. 5 shows an attenuation map of the board eraser of FIG. 4.

Figure 6:
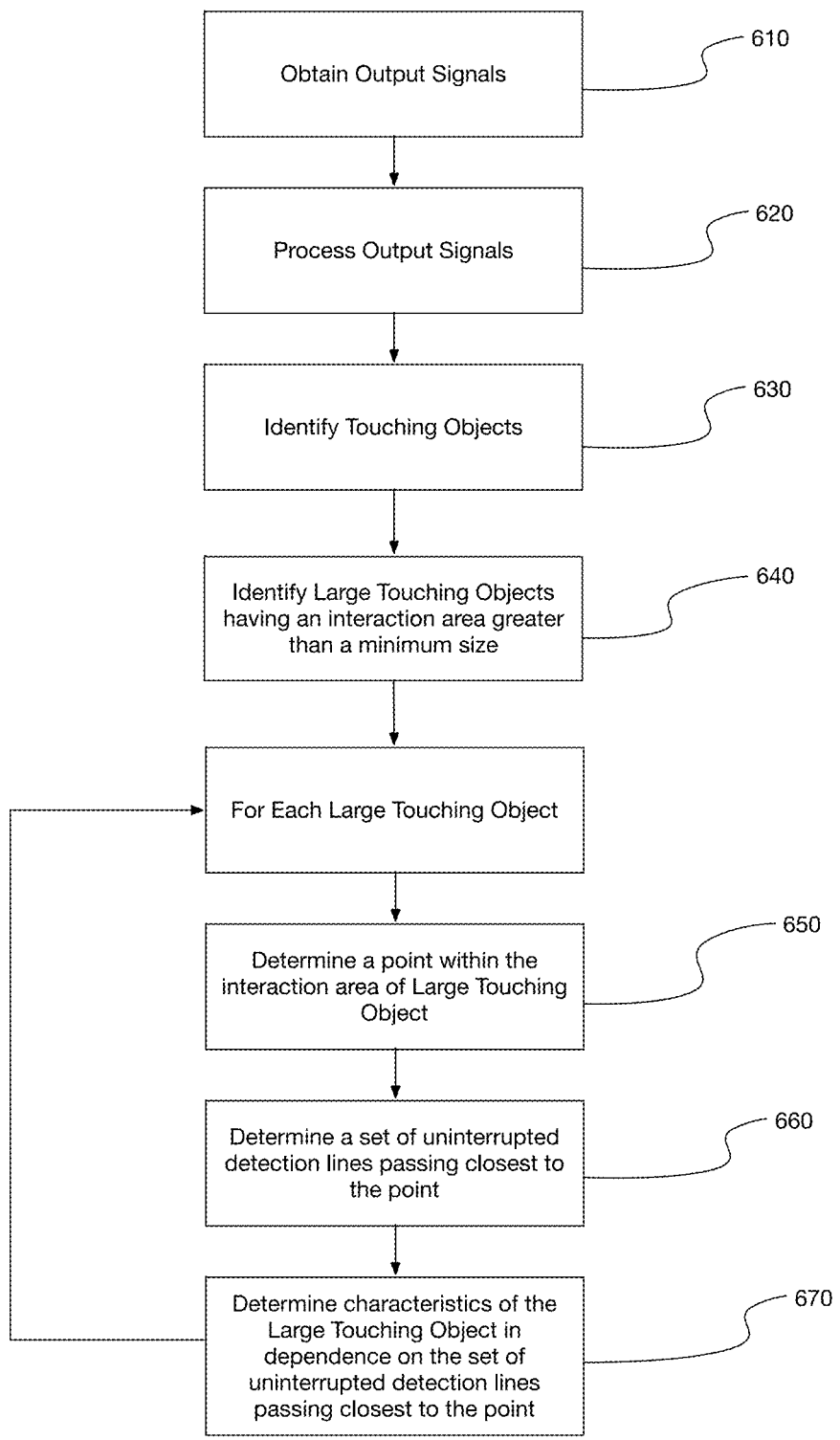
FIG. 6 is a flow chart showing a process for determining characteristics of a large touching object.

FIG. 6 shows a flow diagram according to an embodiment.

In step 610 of FIG. 6, the signal processor 140 receives and samples output signals from detectors 30b.

In step 620, the output signals are processed for determination of the transmission values (or 'transmission signals'). As described above, the transmission values represent the received energy, intensity or power of light received by the detectors 30b on the individual detection lines 50.

In step 630, the signal processor 140 is configured to process the transmission values to determine the presence of one or more touching objects on the touch surface. In an embodiment, the signal processor 140 is configured to process the transmission values to generate a two-dimensional attenuation map of the attenuation field across the touch surface, i.e. a spatial distribution of attenuation values, in which each touching object typically appears as a region of changed attenuation. From the attenuation map, two-dimensional touch data may be extracted and one or more touch locations may be identified. The transmission values may be processed according to a tomographic reconstruction algorithm to generate the two-dimensional attenuation map of the attenuation field.

In one embodiment, the signal processor 140 may be configured to generate an attenuation map for the entire touch surface. In an alternative embodiment, the signal processor 140 may be configured to generate an attenuation map for a sub-section of the touch surface, the sub-section being selected according to one or more criteria determined during processing of the transmission values.

In an alternative embodiment, the signal processor 140 is configured to process the transmission values to determine the presence of one or more touching objects on the touch surface by determining intersections between attenuated or occluded detection lines, i.e. by triangulation. In yet another embodiment, the signal processor 140 is configured to process the transmission values to determine the presence of one or more touching objects on the touch surface using non-linear touch detection techniques such as those described in US patent application publication 20150130769 or 20150138105.

In step 640, the signal processor 140 is configured to identify large touching objects having an interaction area greater than a minimum size. In an embodiment, an area of the attenuation map defined by the object interaction is identified. Within the identified area, the point having the highest attenuation value is identified. Then, a flood fill algorithm is applied, starting from the highest attenuation point and selecting all contiguous points in the attenuation map having an attenuation value within a value range of the highest attenuation point. If a sufficiently large number of pixels are selected by the flood fill, the object is determined to be a large object. Alternatively, if the largest diameter of the shape defined by the flood fill is greater than a threshold, the object is designated as a large object. For example, if eraser objects of at least 30 mm in width are determined to be large objects and the reconstructed pixels (i.e. co-ordinates in the attenuation map) are 5 mm in average diameter, the diameter threshold for designating a large object is set to 6 pixels. In one embodiment, an initial size estimate for an object may be determined using centroid and image moments. If the initial size estimate is sufficiently large enough a more detailed analysis using, for example, a flood fill analysis may be used to accurately determine size.

In some embodiments, all touching objects are processed according to the following steps and not just large objects.

In step 650, for each identified large touching object, the signal processor 140 is configured to determine an object reference point 110 within the interaction area of large touching object 310. In one embodiment, an image moment is applied to the attenuation map (e.g. that shown in FIG. 5) to determine a centroid of a detected touching object, for use as the object reference point. E.g. For a scalar attenuation map with pixel intensities I(x,y), raw image moments $M_{ij}$ are calculated by:

$$M_{ij} = \sum_x \sum_y x^i y^j I(x, y)$$

The centroid of the image moment may be calculated as:

$$\{°x, °y°\} = \{M_{10}/M_{00}, °M_{01}/M_{00}°\}$$

In another embodiment, signal processor 140 is configured to determine an object reference point within the interaction area of large touching object by determining a local maxima (i.e. point of highest attenuation) in the area of the attenuation map covered by the object. In another embodiment, signal processor 140 is configured to determine an object reference point within the interaction area of large touching object by selecting a point at random within the boundary of the large touching object.

In step 660, the signal processor 140 is configured to determine a set of relatively un-attenuated or un-occluded detection lines passing closest to the object reference point. In an embodiment, the detection lines from each emitter are analysed to determine the detection line passing closest to the object reference point. Then, the first detection lines clock-wise and counterclockwise relative to the closest detection line that are determined to be unaffected (i.e. not substantially attenuated or occluded by the object) are determined to be boundary detection lines, partially defining the boundaries of the object. This process is repeated for each emitter until boundary detection lines for the object are determined for each emitter.

Figure 7A:
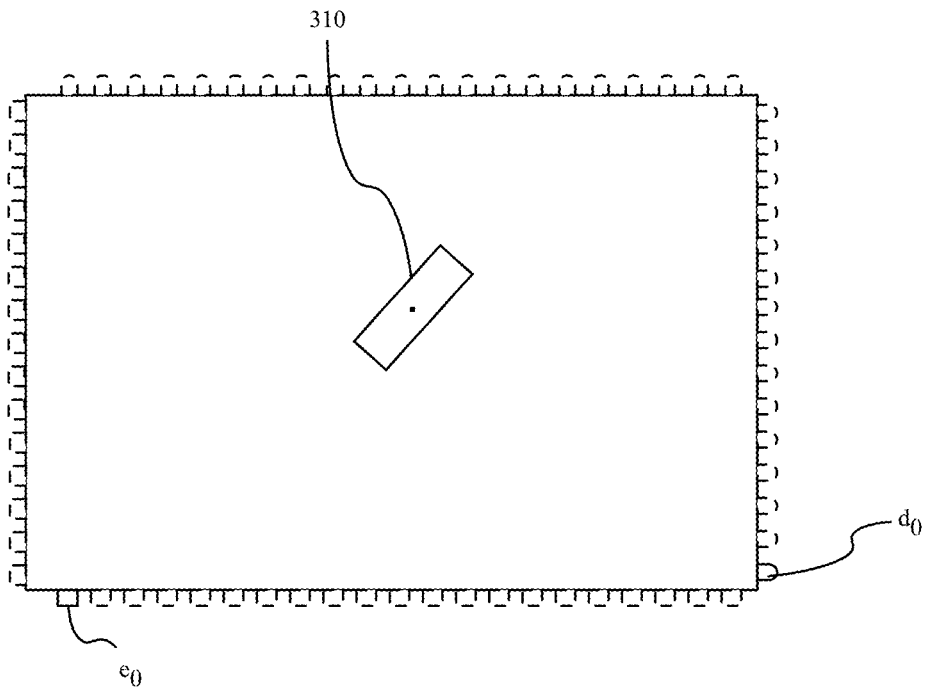
FIGS. 7a-7f shows a sequence of steps for determining characteristics of a large touching object.

In more detail, an embodiment of step 660 includes the following steps:

1) The emitter/detector pairs forming each detection line are analysed in a counter-clock-wise direction. As shown in FIG. 7a, the detection line from the first emitter e0 on the bottom side of the touch surface and the first detector d0 on the right side is the first detection line to be analysed. For the purposes of clear explanation, the touch system shown in FIG. 7 shows only emitters along left and bottom edges and detectors along the right and top edges. However, it is understood that the present concepts may be applied to touch systems having a variety of emitter and detector geometries including interleaved emitter and detector arrangements.

Figure 7B:
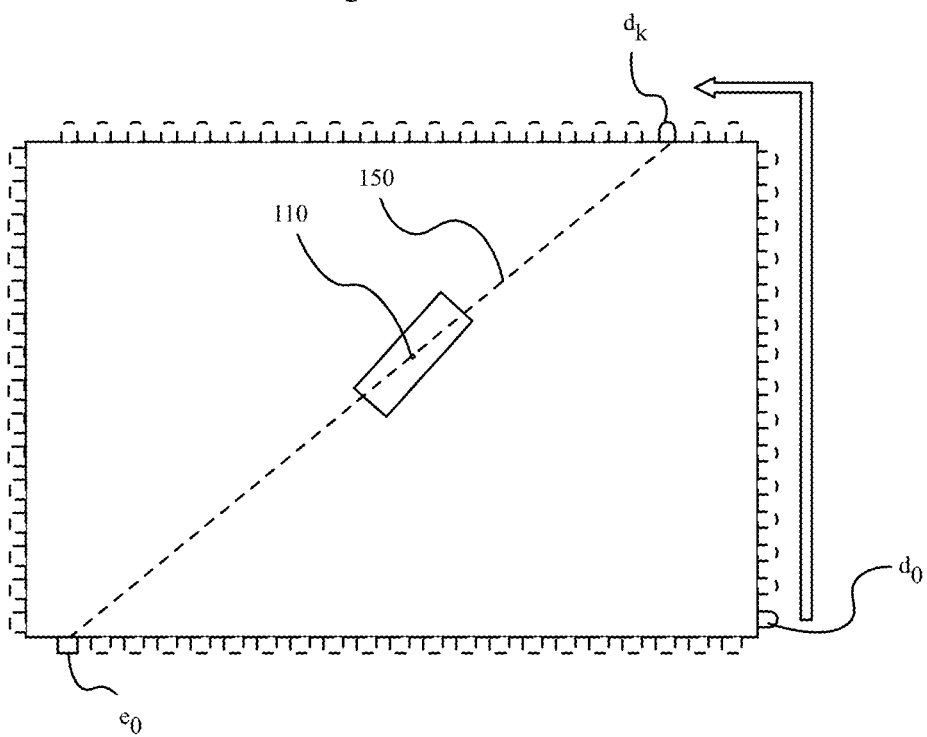

2) As shown in FIG. 7b, the detector counter is then incremented in clock-wise direction (i.e. $d_{i+1}$) and the detection line between emitter $e_0$ and the incremented detector $d_{i+1}$ is analysed. This loop continues and the detection lines from the emitter are therefore analysed in a counterclockwise pattern until the intersect detection line 150 from $e_0$ to $d_k$ and passing through the object reference point 110, or determined to pass closest to the object reference point 110, is found.

Figure 7C:
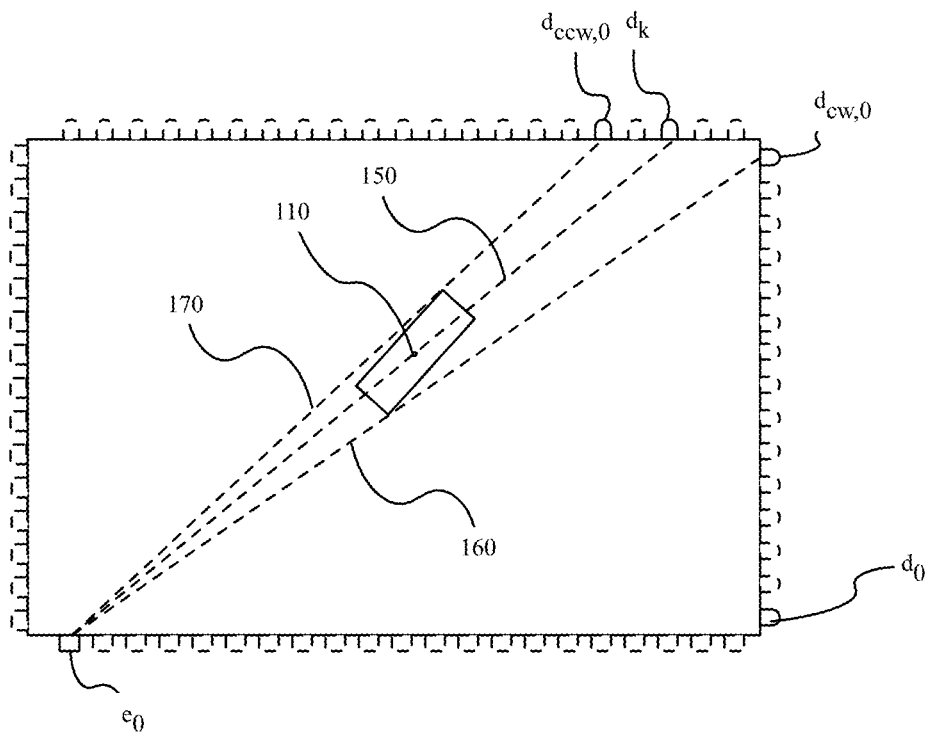

3) FIG. 7c shows the boundary lines 160 and 170. Boundary lines 160 and 170 are determined to be the detection lines that:

Originate from $e_0$

Have the closest angular distance to intersect detection line 150 in a clock-wise and counterclockwise direction, Are determined to be unaffected (i.e. not substantially attenuated or occluded) by object 310.

In FIG. 7c, boundary lines 160 and 170 are shown to be detection lines between e0 and and $d_{cw,0}$ and $e_0$ $d_{ccw,0}$ and respectively (where subscript cw or ccw indicate the direction and 0 indicates the corresponding emitter number). In an embodiment, a detection line is determined to be unaffected by an object when it is attenuated (or occluded) by less than 50%. E.g. The transmission value of the detection line is greater than 50% of its maximum value when there is no touch/pen/eraser interaction. Preferably, the maximum transmission value for a detection line is determined in dependence on an estimated background level for each detection line. An estimated background level may be maintained and updated only when there are no interactions with the touch surface. Alternatively, a background level can be measured during a calibration step during manufacturing.

For FTIR based systems, the attenuation resulting from object interaction with the touch surface is substantially lower. Therefore, the differentiation between an affected and unaffected detection line is dependent on a correspondingly lower attenuation threshold (e.g. 0.1%-10%).

In an embodiment, the first unaffected detection line identified in a clockwise search from intersect detection line 150 is set to be boundary line 160. Similarly, the first unaffected detection line identified in a counterclockwise search from intersect detection line 150 is set to be boundary line 170

Figure 7D:
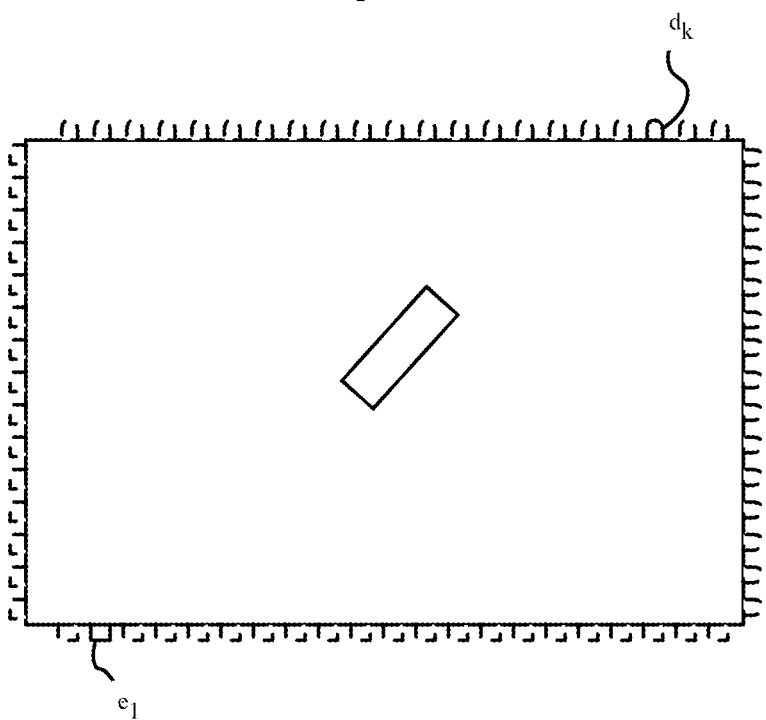
Figure 7E:
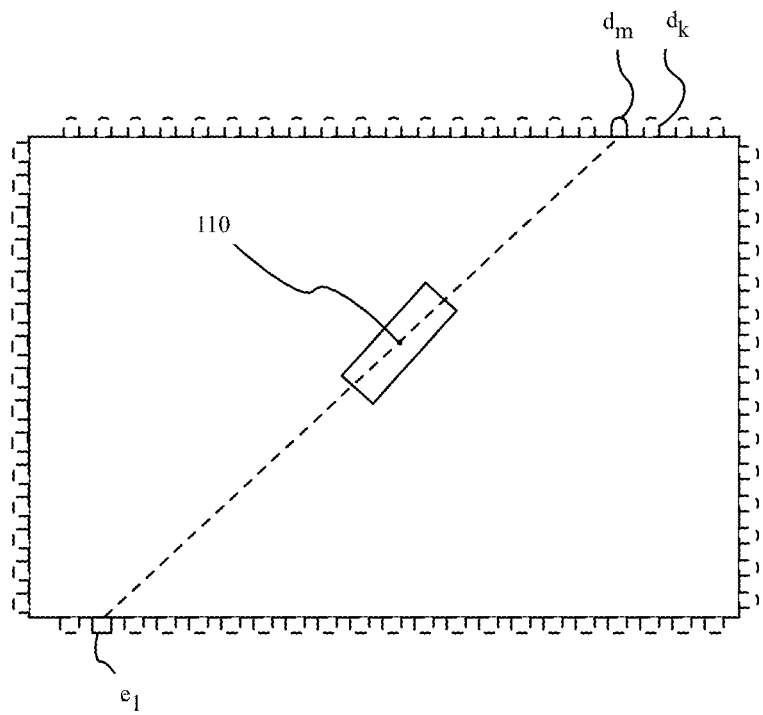
Figure 7F:
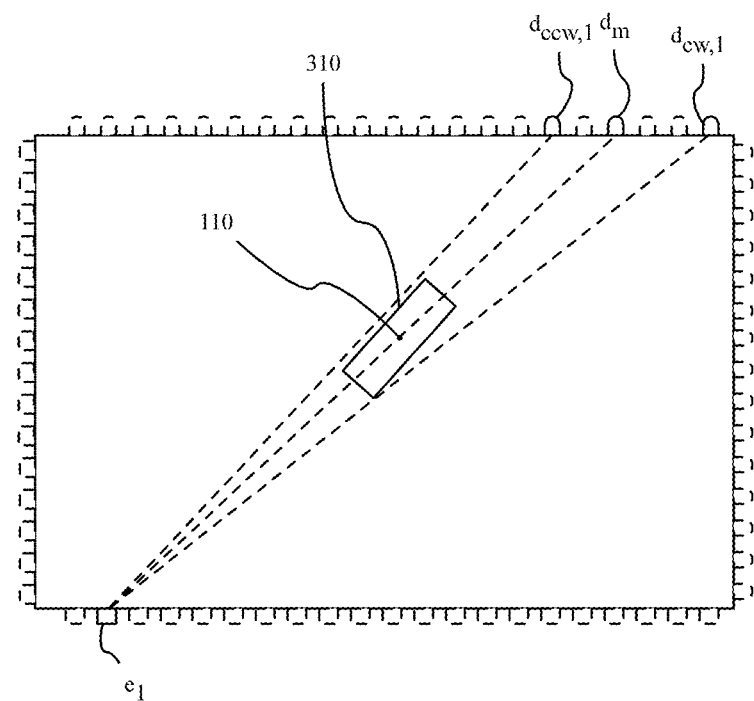

4) As shown in FIG. 7d-f, after boundary lines 160 and 170 for object 310 have been determined for $e_0$, the next emitter in the counterclockwise direction (e.g. $e_{j+1}$) is used and steps 1-3 are repeated. This process is repeated until boundary lines 160 and 170 for object 310 are determined for every emitter.

As the emitter/detectors are processed in a circular (and clock-wise) order, a geometric consequence is that the detection line defined by $[e_{j+1},d_k]$ will be further away (clock-wise direction) from the object reference point 110 than $[e_j,d_k]$. Therefore, in a preferable configuration, when detection lines for the next emitter in the clock-wise direction are analysed, the first detection line to be analysed may be $[e_{j+1},d_k]$ and then continued in a clock-wise direction. This allows a significant reduction in the number of computations required to determine the set of object boundary lines.

In step 670 of FIG. 6, the signal processor 140 is configured to determine characteristics of the large touching object in dependence on the set of uninterrupted detection lines passing closest to the point.

1) A true centre point 140 of a rectangle object 310 (as opposed to object reference point 110) can now be found as the solution to the following over-determined set of linear equations, solved using normal equations.

A normal vector (having unit length) for each emitter-to-detector detection line as well as a position on each detection line (which can be the geometrical position of either emitter or detector or some other point) is determined.

For all emitters j, we get two linear equations for each emitter:

dot_product(normal($e_j$-$d_{ccw,j}$), center-position$_j$)=0 dot_product(normal($e_j$-$d_{ccw,j}$), center-position$_j$)=0

Where normal is the normal vector and position$_j$ is a position along the detection line. Then, all of the linear equations are solved to determine a centre position 140.

This technique also allows a centre position to be determined for regular shapes, oblongs, etc.

Figure 10:
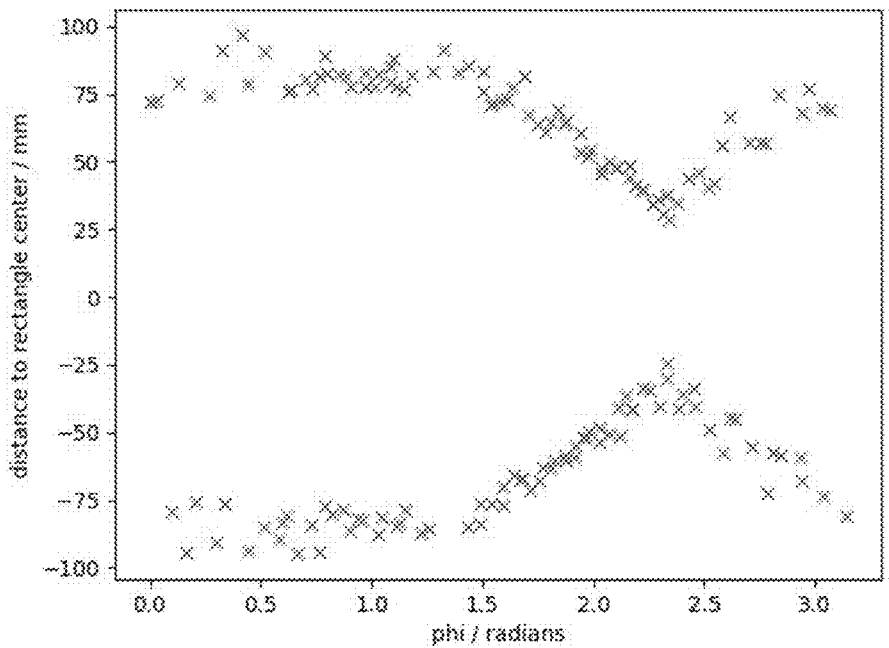
FIG. 10 is plot of object boundary lines values of phi against distance to the object centre.

2) Once centre point 140 has been determined, all determined boundary lines for all emitters are analysed to determine their angle φ (phi), defined as the angle between the normal to the detection line and the touch surface x-axis 400, and the shortest distance from centre point 140 to the detection line. FIG. 10 shows a typical plot of all boundary line values of phi against distance to centre point 140. FIG. 10 shows both positive and negative distances as the distance is the projection onto the normal. Negative values correspond to detection lines whose normal (defined by the normal to the direction from detector to emitter) points away from the point. Boundary lines defined by $e_j$ and $d_{cw,j}$ will have the opposite sign to boundary lines defined by $e_j$ and $d_{ccw,j}$ in FIG. 10.

3) The boundary line with the smallest magnitude distance from centre point 140 is then determined (defined here as the 'selected boundary line'). The characteristics of the selected boundary line will provide information useful information about the characteristics of object 310. First, where the object is substantially rectangular, e.g. as shown in FIG. 4, the width 430 of object 310 the may be determined in dependence on the vector 200 defining the shortest distance from the selected boundary line to centre point 140. As the object is rectangular, the magnitude of the vector may be assumed to be half of width 430. Therefore width 430 of object 310 may be determined to be twice the magnitude of the vector.

Furthermore, the angle of the vector 200 also defines the orientation angle 440 of rectangular object 310. The angle phi of vector 200 defines the narrow axis 410 of object 200. Consequently, the angle of the wide axis 405 of the rectangle may be defined as $$phi \pm \frac{\pi}{2}.$$

Using $$phi \pm \frac{\pi}{2},$$

we can also use vector 200 of the boundary line located at $$phi \pm \frac{\pi}{2}$$

in FIG. 10 to determine the height 420 of the object. Similar to above, height 420 of object 310 may be determined to be twice the magnitude of the vector 200 of the boundary line located at $$phi \pm \frac{\pi}{2}.$$

In one embodiment, the phi and height values for object 310 are determined using an average of a plurality of the smallest values.

Figure 8:
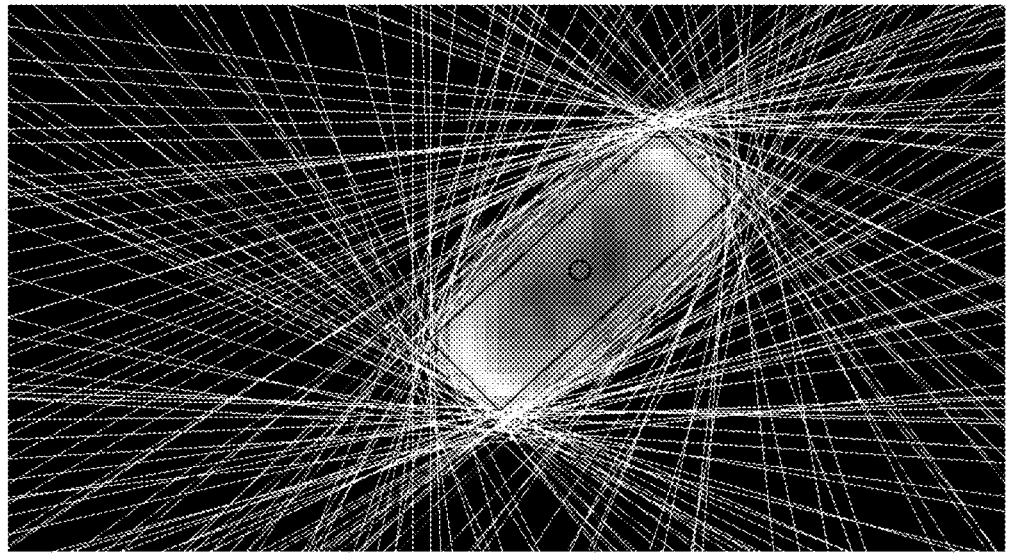
FIG. 8 shows all detection lines used to determine a rectangular touching object and its centre position overlaid on an interaction map.
Figure 9:
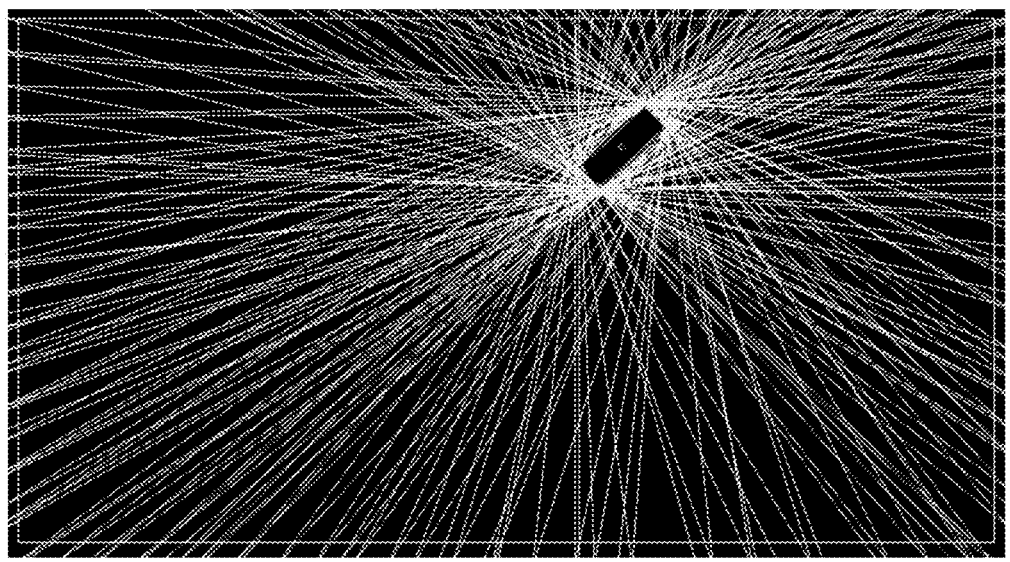
FIG. 9 shows a touch system with all the detection lines used to determine a rectangular touching object.

FIG. 8 shows an attenuation map of an object 310 with an overlay of all determined boundary lines. FIG. 9 shows an equivalent set of boundary lines without the underlying attenuation map.

Figure 11:
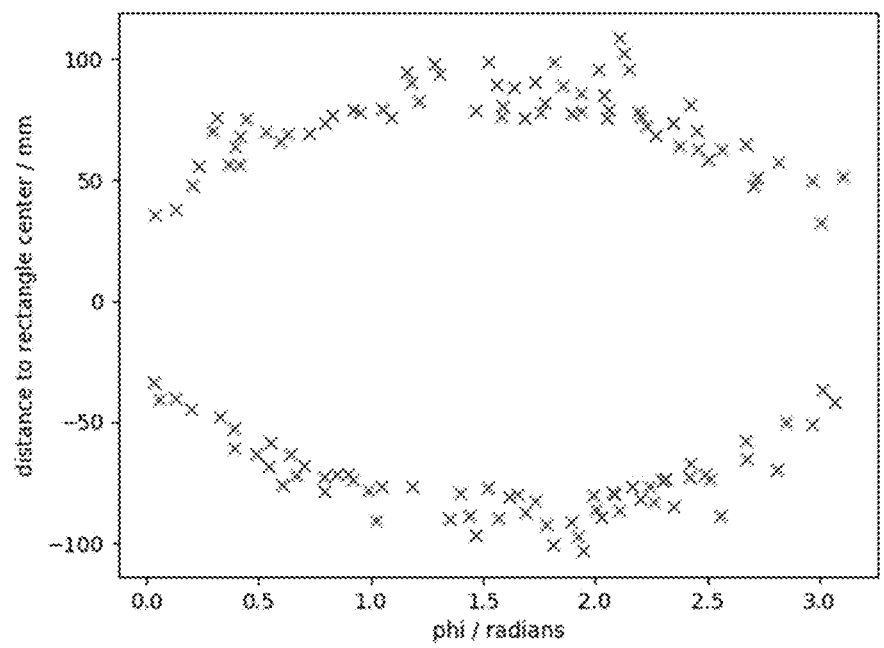
FIG. 11 is plot of object boundary lines values of phi against distance to the object centre where the object is aligned with the phi axis.

FIG. 11 shows an example plot of object boundary lines values of phi against distance to the object centre, similar to FIG. 10, but wherein the object is located at the axis of phi. The plot effectively wraps at 0 and pi.

In system where detection lines are unstable or unreliable due to ambient noise or other factors, the touch system may invalidate certain detection lines, all detection lines from one emitter, or all detection lines to one detector, from use. In an embodiment, all detection lines determined to be invalid by the system are excluded from use as boundary lines. Similarly, where one or more detection line has been recently re-validated after a period of being invalidated, the one or more detection lines are still excluded from use as boundary lines for a period of time (e.g. between 1 and 500 ms.)

If the system determines that a single boundary line of a pair of boundary lines from an emitter is unstable or unreliable, the pair of boundary lines will not be used for determination of the centre point 140. However, the other boundary line of the pair may still be used for determination of object characteristics.

Figure 12:
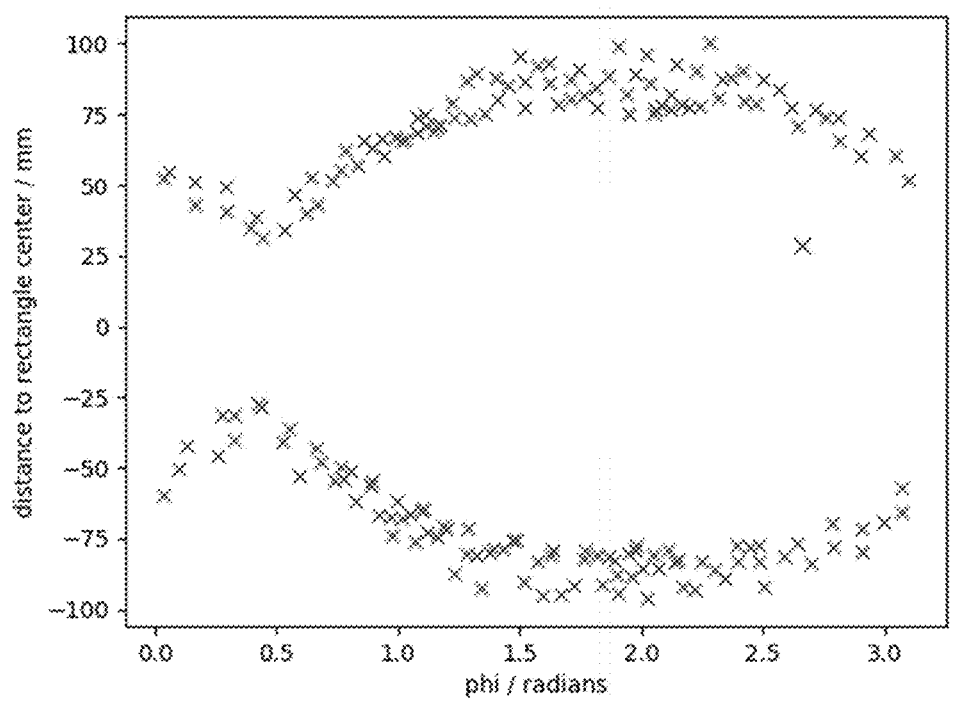
FIG. 12 is plot of object boundary lines values of phi against distance to the object centre showing a noise value to be filtered.

Other considerations for handling the noise in a touch system are described. In one embodiment, where intersect detection line 150 is determined to be unaffected by object 310 or otherwise too noisy, the boundary lines 160 and 170 for the corresponding emitter are discarded. In another embodiment, boundary lines having an angular distance that is significantly smaller than an average for a small phi-region are analysed and pruned. As shown in FIG. 12, a single boundary lines at phi=2.6 is too close to the centre and hence it is removed from consideration. Similarly, any boundary lines that lie too far from a median or average of nearby boundary lines may also be filtered.

In one embodiment, pairs of boundary lines 160 and 170 are discarded when their mutual angle is larger than a threshold angle. Preferably, the threshold angle is defined as:

$$\arctan\left(\frac{\text{maximum allowable object height}}{\text{distance between centre point 140 and emitter}}\right)$$

or any similar approximation. This allows exclusion of pairs of boundary lines which would indicate an object above an allowable size. Other suitable threshold angles, such as fixed angles, may also be used. Removal of boundary lines where the mutual angle exceeds a threshold reduces problems with other occluding touches/erasers.

In one embodiment, the shape of the object 310 is optimized to the plotted data of FIG. 10 using many or all of the plotted boundary lines. An example of a suitable optimization algorithm is an algorithm for maximising rectangular area whilst fitting within the boundary lines. This optimization may include the use of boundary lines as defined in the various ways above.

A determination of if the shape of the found rectangle is more similar to a circle than a square/rectangle may be performed by analysis of the distance values between the boundary lines 160 and 170 of each pair on FIG. 10. A rectangular shape may be expected to have a variation of at least sqrt(2)*rectangular width 430 between the boundary values. A circle, on the other hand, would be expected to have a substantially consistent distance between values of boundary lines 160 and 170 pairs in FIG. 10.

In one embodiment, a statistical analysis of the plotted boundary lines is performed to determine the quality of the shape data, e.g. the noisiness of the shape as compared with an expected shape. Where the shape is determined to be noisy and a confidence in the data to match a known shape is determined to be low, the system is configured to fall back to shape and position determined by flood filled attenuation map or other alternative methods of determining shape data.

In an alternative embodiment, boundary lines 160 and 170 are determined to be the detection lines that:

Originate from $e_0$

Have the further angular distance to intersect detection line 150 in a clock-wise and counterclockwise direction, Are determined to be affected (i.e. substantially attenuated or occluded) by object 310.

In this embodiment, a detection line is determined to be affected by an object when it is attenuated (or occluded) by more than 50%. E.g. The transmission value of the detection line is lower than 50% of its maximum value when there is no touch/pen/eraser interaction. In this embodiment, boundary lines 160 and 170 may be determined to be the last affected detection when moving clockwise (for boundary line 160) or counterclockwise (for boundary line 170) away from intersect detection line 150.

In this embodiment, the boundary lines are determined to be the set of detection lines having a transmission value below a first threshold and passing within the boundaries of the object but furthest from the object reference point. In an FTIR embodiment of the above, the attenuation resulting from object interaction with the touch surface is substantially lower. Therefore, the differentiation between an affected and unaffected detection line is dependent on a correspondingly lower attenuation threshold (e.g. 0.1%-10%).

In another embodiment, a combination of boundary lines calculated according to the above embodiments may be used in combination to determine an improved accuracy of object characteristics determination.

It is noted that the order in which detection lines are analysed is arbitrary. It is possible to start with fixed emitters or detectors when search for intersect detection lines and boundary lines.

What is claimed is:

1. A touch sensing apparatus, comprising:
   a touch surface,
   a plurality of emitters, arranged around a periphery of the touch surface, configured to emit a plurality of light beams such that one or more objects touching the touch surface cause an attenuation of at least one of the plurality of light beams;
   a plurality of detectors, arranged around the periphery of the touch surface, configured to receive light from the plurality of emitters on a plurality of light paths, wherein each detector in the plurality of detectors is arranged to receive light from more than one emitter of the plurality of emitters; and
   a hardware processor configured to:
      determine, based on output signals from the plurality of detectors, a plurality of transmission values, each of the plurality of transmission values corresponding to each of the plurality of light paths;

determine an object reference point on the touch surface where the light is attenuated or occluded by an object based on the plurality of transmission values;
determine one or more unaffected light paths from the plurality of light paths that are not affected by the object based on the plurality of transmission values;
determine, from the one or more unaffected light paths that are not affected by the object, one or more object boundary light paths in relation with the object reference point; and
determine one or more characteristics of the object based on the one or more object boundary light paths,
wherein the one or more object boundary light paths comprise a closest boundary light path passing closest to the object reference point.

2. The touch sensing apparatus of claim 1, further comprising a light transmissive panel defining the touch surface and an opposite surface, wherein the emitters are configured to introduce light into the panel for propagation by internal reflection between the touch surface and the opposite surface, and the detectors are configured to receive the light propagating in the panel.

3. The touch sensing apparatus of claims 1, wherein the emitters are configured to transmit the beams of light above the touch surface and the detectors are configured to receive said beams of light travelling above the touch surface.

4. The touch sensing apparatus of claim 1, wherein processing the transmission values comprises operating an image reconstruction algorithm on at least a portion of the transmission values to determine areas of the touch surface attenuated by objects.

5. The touch sensing apparatus of claim 4, wherein the image reconstruction algorithm is an algorithm for transmission tomography.

6. The touch sensing apparatus of claim 1, wherein processing the transmission values to determine the object reference point on the touch surface where the light is attenuated by an object comprises triangulation of attenuated or occluded light paths.

7. The touch sensing apparatus of claim 1, wherein the one or more object boundary light paths further comprises a closest perpendicular boundary light path, the closest perpendicular boundary light path being the object boundary light path passing closest to the object reference point and having an angle of between $$\frac{\pi}{2} \pm \frac{\pi}{4}$$

relative to the closest boundary light path.

8. The touch sensing apparatus of claim 1, wherein determining characteristics of the object comprises determining at least one of the centre point, orientation angle, width, and height of the object.

9. The touch sensing apparatus of claim 1, wherein the step of determining characteristics of the object comprises determining an orientation of the object in dependence on the angle of the closest boundary light path.

10. The touch sensing apparatus of claim 1, wherein the step of determining characteristics of the object comprises determining an orientation of the object in dependence on the angle of the closest boundary light path and the closest perpendicular boundary light path.

11. The touch sensing apparatus of claim 1, wherein the step of determining characteristics of the object comprises determining a limit of a first surface of the object in dependence on the closest boundary light path.

12. The touch sensing apparatus of claim 1, wherein the step of determining characteristics of the object comprises determining a position of a first surface of the object in dependence on the closest boundary light path and the closest perpendicular boundary light path.

13. A method of determining characteristics of an object in contact with a touch surface of a touch sensing apparatus, said touch sensing apparatus comprising:
a touch surface,
a plurality of emitters arranged around a periphery of the touch surface, configured to emit a plurality of light beams such that one or more objects touching the touch surface cause an attenuation of at least one of the plurality of light beams; and
a plurality of detectors, arranged around the periphery of the touch surface, configured to receive light from the plurality of emitters on a plurality of light paths, wherein each light detector in the plurality of detectors is arranged to receive light from more than one emitter of the plurality of emitters;
said method comprising:
determining, based on output signals from the plurality of detectors, a plurality of transmission values, each of the plurality of transmission values corresponding to each of the plurality of light paths;
determine an object reference point on the touch surface where the light is attenuated or occluded by an object based on the plurality of transmission values;
determining one or more unaffected light paths from the plurality of light paths that are not affected by the object based on the plurality of transmission values;
determining, from the one or more unaffected light paths that are not affected by the object, one or more object boundary light paths in relation with the object reference point, and
determining one or more characteristics of the object based on the one or more object boundary light paths,
wherein the one or more object boundary light paths comprise a closest boundary light path passing closest to the object reference point.

* * * * *